United States Patent
Gutierrez

(10) Patent No.: US 6,285,669 B1
(45) Date of Patent: Sep. 4, 2001

(54) CDMA DIRECT SPREAD OVERLAY SYSTEM AND METHOD OF OPERATION

(75) Inventor: Alberto Gutierrez, Plano, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/116,407

(22) Filed: Jul. 16, 1998

Related U.S. Application Data

(60) Provisional application No. 60/075,027, filed on Feb. 18, 1998, and provisional application No. 60/052,882, filed on Jul. 17, 1997.

(51) Int. Cl.$^7$ .................................................. H04B 7/216
(52) U.S. Cl. .......................... 370/335; 370/209; 370/341; 370/342; 370/479; 375/140
(58) Field of Search .................................... 370/208, 209, 370/335, 342, 479, 468, 328, 329, 330, 338, 340, 341; 375/130, 131, 140, 141, 146, 147

(56) References Cited

U.S. PATENT DOCUMENTS

| | | | |
|---|---|---|---|
| 5,793,757 | * | 8/1998 | Uddenfeldt ............................ 370/335 |
| 5,956,345 | * | 9/1999 | Allpress ................................ 370/209 |
| 6,081,536 | * | 6/2000 | Gorsuch et al. ...................... 370/468 |

\* cited by examiner

*Primary Examiner*—Ricky Ngo
(74) *Attorney, Agent, or Firm*—Bruce Garlick; James Harrison

(57) ABSTRACT

A CDMA communication system supports underlay transmissions and direct spread overlay transmissions such that the overlay transmissions are at least partially orthogonal to underlay transmissions. A base station supports both the underlay transmissions and the overlay transmissions and includes an interface to a mobile switching center, an underlay unit, an overlay unit and at least one radio frequency (RF) unit. The interface receives communications intended for a plurality of mobile stations serviced by the base station. These communications include underlay communications intended for mobile stations (MSs) supporting underlay transmissions and overlay communications intended for MSs supporting overlay transmissions. The underlay unit receives the underlay portion of the communications and produces underlay transmissions. The overlay unit receives the overlay portion of the communications and produces overlay transmissions. Then, the underlay transmissions and the overlay transmissions are received by the at least one RF unit and transmitted via at least one antenna to the plurality of MSs. Each of the MSs receives both the underlay transmissions and the overlay transmissions. However, those MSs supporting the underlay transmissions extract intended underlay communications while the MSs supporting overlay transmissions extract intended overlay communications. The underlay unit and the overlay unit produce the overlay transmissions such that they are at least partially orthogonal to the underlay transmissions. A synchronization unit coupled to the underlay unit and the overlay unit that causes the overlay transmissions to be substantially synchronized with the underlay transmissions. In another construction, differing base stations provide the underlay transmissions and the overlay transmissions.

36 Claims, 15 Drawing Sheets

CDMA DIRECT SPREAD OVERLAY SYSTEM AND METHOD OF OPERATION

CROSS-REFERENCES TO RELATED APPLICATIONS

The present application claims priority pursuant to 35 U.S.C. Sec. 119(e) to U.S. Provisional Application Serial No. 60/052,882, filed Jul. 17, 1997, pending, and to U.S. Provisional Application Serial No. 60/075,027, filed Feb. 18, 1998, pending, both of which are hereby incorporated herein by reference in their entirety.

BACKGROUND

1. Field of the Invention

The present invention relates generally to cellular wireless communications and more particularly to a code division multiple access (CDMA) cellular wireless communication system having an underlay system and a direct spread (DS) overlay system that occupy common spectrum and with the overlay system operating at least partially orthogonally to the underlay system.

2. Description of the Related Art

Cellular wireless communication systems are generally known to include a plurality of base stations dispersed across a geographic service area. Each of the base stations includes at least one antenna and a base station transceiver system (BTS) and provides wireless service within a respective cell. The BTSs couple to base station controllers (BSCs) with each BSC serving a plurality of BTSs. The BSCs also couple to a mobile switching center (MSC) which interfaces to the Public Switched Telephone Network (PSTN) and other MSCs. Together, the BTSs, BSCs and the MSC form a wireless network which provides wireless coverage to mobile stations (MSs) operating within a respective service area.

Wireless communication systems operate according to various protocol standards. One particular protocol standard in place worldwide is the CDMA protocol standard. CDMA is a direct sequence spread spectrum system in which multiple spread spectrum signals are transmitted and received simultaneously over a common frequency band. In the CDMA system, each mobile station (MS) may be assigned a distinct Walsh code which identifies the signals transmitted to and received from the MS.

In an example of operation thereunder, forward link signals from a BTS to a first MS are spread with a first Walsh code and then transmitted where the process of transmission includes pseudo noise (PN) scrambling (spreading). Likewise, forward link signals transmitted from the BTS to the second MS are spread with the second Walsh code and then transmitted, perhaps concurrently with transmissions from the BTS to the first MS. The first MS's receiver receives at its antenna all of the energy transmitted by the BTS. However, because Walsh code channels are orthogonal, after despreading the received signal with the first Walsh code, the despreader outputs all the energy intended for the first MS but, due to orthogonality loss, none of or only a small fraction of the energy intended for the second, third, etc., MS. Likewise, the second MS despreads the received forward link signal with the second Walsh code to receive its intended forward link energy. Each of the MSs then operates upon the despread signal energy to extract data intended for the respective MS. The number of users accommodated on the forward link is limited by intra-cell interference due to orthogonality loss, inter-cell interference and other interference such as that due to thermal noise.

In some specialized applications (e.g. fixed access) the reverse link channels may be configured such that Walsh codes separate reverse link users. However, in the typical case, the reverse link is strictly interference limited. In such special cases wherein signals are configured using Walsh codes, operation on the reverse link from the MSs to the BTS is similar to operation on the forward link. A plurality of MSs transmit to the BTS simultaneously on the reverse link with each reverse link transmission spread by a respective assigned Walsh code. A receiver of the BTS receives the composite reverse link signal and despreads the reverse link transmissions with expected Walsh codes to extract signals received from the first, second, third, etc., MS. The BTS then operates upon each despread signal to extract data sent by the MSs.

Because signals intended for other users of the CDMA system may appear as noise to other users due to orthogonality loss, because they are from another cell or because they are not orthogonal, CDMA capacity is interference limited. The number of users that can use the same spectrum and still have acceptable performance is determined by the total interference power that all of the users, taken as a whole, generate. Thus, the number of users that may be supported by each BTS on any frequency spectrum is limited. To increase the capacity of CDMA systems, additional base stations may be added to increase the number of cells within the service area. However, because load is often concentrated in a small geographic area, even with the addition of cells, particular cells may remain overloaded while neighboring cells are lightly loaded.

Thus, solutions have been proposed to overcome overcrowding in CDMA systems. One solution includes assigning multiple carriers within a single service area, with each of the multiple carriers servicing respective overlaying cells. In multiple carrier operation, each carrier is assigned a segment of the available spectrum which does not overlap other assigned segments of the available spectrum. Some mobile stations are serviced on one of the carrier frequencies while other of the mobile stations are serviced on other of the carrier frequencies.

Another method of improving capacity is to deploy carriers with wider bandwidths. This improves system capacity due to better spectral characteristics of the wideband users. However, interoperability of basic carrier systems and the wideband carrier systems would be problematic since the need to deploy both systems in the same frequency spectrum would arise.

A particular solution that addresses the interoperability issue is direct spread (DS) overlay wherein an overlay system operates atop an underlay system so that the overlay and underlay systems at least partially share frequency spectrum. In CDMA systems which employ orthogonal transmissions, an important element is an attempt to maintain orthogonality of transmissions. However, heretofore, preserving orthogonality has not been accomplished in an underlay/overlay system. Thus, minimal benefit was provided in having a DS overlay system.

Thus, there exists a need in the art for an underlay/overlay CDMA system in which overlay is employed but in which an overlay system has minimal adverse affect on the underlay system and vice versa.

SUMMARY OF THE INVENTION

In order to overcome the shortcomings among other shortcomings of prior CDMA systems, a communication system constructed according to the present invention supports underlay and overlay transmissions. In order to increase system capacity and to support interoperability with wider band CDMA systems but to minimize impact on the system, a CDMA system constructed according to the present invention provides overlay transmissions that are at least partially orthogonal to underlay transmissions supported by the system.

In one construction of a base station according to the present invention for use in a CDMA wireless communication system, the base station supports both the underlay transmissions and the overlay transmissions. In such a construction, the base station includes an interface to a mobile switching center, an underlay unit, an overlay unit and at least one radio frequency (RF) unit. The interface receives communications intended for a plurality of mobile stations serviced by the base station. These communications include underlay communications intended for mobile stations (MSs) supporting underlay transmissions and overlay communications intended for MSs supporting overlay transmissions.

The underlay unit receives the underlay portion of the communications and produces underlay transmissions. The overlay unit receives the overlay portion of the communications and produces overlay transmissions. Then, the underlay transmissions and the overlay transmissions are received by the at least one RF unit and transmitted via at least one antenna to the plurality of MSs. Each of the MSs receives both the underlay transmissions and the overlay transmissions. However, those MSs supporting the underlay transmissions extract intended underlay communications while the MSs supporting overlay transmissions extract intended overlay communications. According to the present invention, the underlay unit and the overlay unit produce the overlay transmissions such that they are at least partially orthogonal to the underlay transmissions.

The base station may also include a synchronization unit coupled to the underlay unit and the overlay unit that causes the overlay transmissions to be substantially synchronized with the underlay transmissions. The level of orthogonality is determined based upon the particular construction and operation of the base station. In one embodiment, the overlay transmissions are partially orthogonal to the underlay transmissions. In another embodiment, the overlay transmissions are substantially orthogonal to the underlay transmissions. In both cases, the signal-to-noise ratio provided is significantly better than that obtained in a non-orthogonal overlay system.

In constructing the overlay transmissions, a pseudo noise sequence of the overlay transmissions may be punctured by a pseudo noise sequence of the underlay transmissions to produce a portion of the orthogonality. Additional orthogonality is obtained by selecting Walsh codes for the overlay transmissions that are orthogonal to Walsh codes of the underlay transmissions. The overlay transmissions may then be spread with an underlay pseudo noise sequence to produce a portion of the orthogonality.

In a typical construction, the overlay transmissions possess a chip rate that is an integer multiple of a chip rate of the underlay transmissions. In such case, the synchronization between the underlay transmissions and the overlay transmissions may be generated.

In other constructions of a CDMA wireless communication system according to the present invention, overlay transmissions are transmitted from a first base station and underlay transmissions are transmitted from another base station. In such case, the synchronization unit provides the necessary timing constraints that are used by the underlay unit and the overlay unit in producing the underlay transmissions and overlay transmissions.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1A:
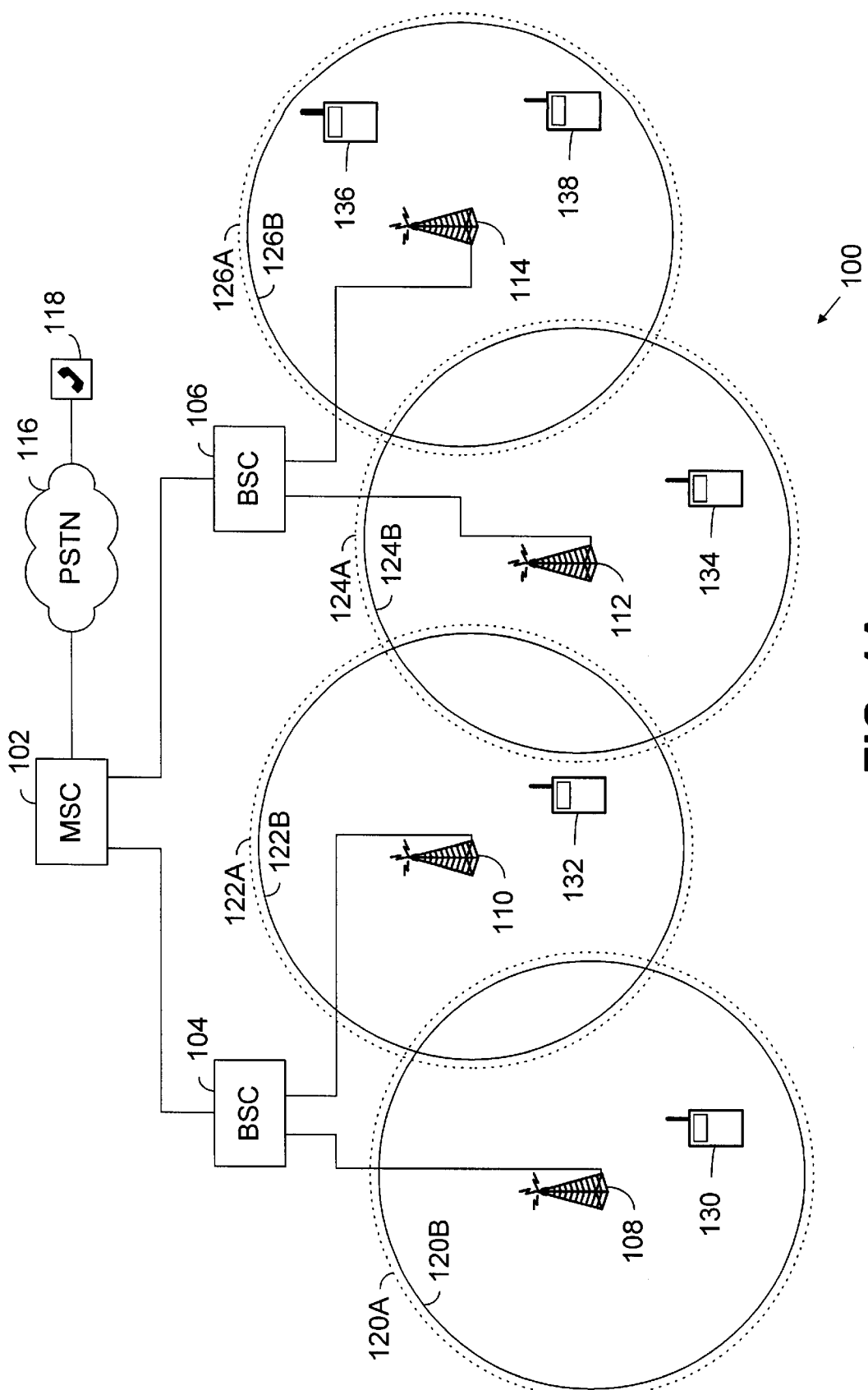
FIG. 1A is a system diagram illustrating a CDMA cellular system having an underlay system and a DS overlay system that operates at least partially orthogonally to the underlay system.

FIG. 1A illustrates a wireless communication system 100 constructed according to the present invention providing wireless service within a respective service area. In the illustrated embodiment, the wireless communication system 100 operates according to a code division multiple access (CDMA) standard, which may be the TIA/EIA/IS95 CDMA standard, and that has been modified to accomplish the teachings of the present invention. The principles of the present invention also apply to other CDMA wireless communication systems operating according to other standards, as well, in which a direct spread (DS) system overlays underlay systems to increase the capacity of the wireless communication system 100.

The wireless communication system 100 includes a mobile switching center (MSC) 102, base station controllers (BSCs) 104 and 106, and a plurality of base stations 108–114, each of which includes an antenna and a base station transceiver subsystem (BTS). The MSC 102 couples the wireless communication system 100 to the PSTN 116. The wireless communication system services calls between a telephone 118 connected to the PSTN 116, for example, and any of a plurality of mobile stations (MSs) 130, 132, 134, 136 and 138 operating within the service area. The wireless communication system 100 also services calls among the plurality of MSs 130, 132, 136 and 138.

BTSs 108 and 110 couple to BSC 104 while BTSs 112 and 114 couple to BSC 106. The BTSs 108–114 are constructed such that they support both underlay transmissions and overlay transmissions. However, according to the present invention, overlay transmissions provided by the BTSs 108–114 are at least partially orthogonal to the underlay transmissions. In this operation, the overlay transmissions therefore do not appear fully as noise to the underlay transmissions even though occupying common frequency spectrum. Thus, the overly transmissions when transmitted according to the present invention increase system capacity as compared to non-orthogonal overlay systems.

Orthogonality between overlay transmissions and underlay transmissions requires that the overlay and underlay transmissions be substantially synchronized with respect to one another upon transmission. Transmissions on the forward link (i.e., BTS to MS transmissions) emanate from a particular BTS and may be synchronized with respect to one another using available techniques. However, reverse link transmissions (i.e., MS to BTS) of a CDMA system are typically not synchronized since they separately emanate from the individual MSs. For this reason, the discussions contained herein are primarily applicable to the forward link of CDMA systems. However, the concepts discussed herein could be applied to reverse link transmissions if timing constraints were equally satisfied.

BTS 108 supports both underlay transmissions in cell 120A and overlay transmissions in cell 120B. Likewise, BTSs 110, 112, 114 provide underlay transmissions in cells 122A, 124A and 126A, respectively, and overlay transmissions in cells 122B, 124B and 126B, respectively. According to the present invention, the overlay transmissions transmitted by any of the BTSs 108–114 are at least partially orthogonal to the underlay transmissions transmitted by the BTSs 108–114. Thus, both underlay and overlay service is provided by each BTS. By providing wireless coverage on both the underlay and overlay systems, interoperability between a basic CDMA system and the wider band CDMA overlay system is provided.

The wireless communication system 100 illustrated in FIG. 1A may be constructed to be backwards compatible with existing CDMA systems which support communications on the underlay system. The system 100, in addition, services overlay transmissions across a relatively wider band. By modifying existing BTS to support the overlay transmissions, as well as continuing to service the underlay transmissions, capacity serviced by the system 100 is increased.

In an example of an operation of the wireless communication system 100, MS 130 supports only underlay transmissions. Thus, the BTS 108 provides forward link underlay transmissions to MS 130 in cell 120A. However, MSs 132 and 134 only support overlay transmissions. Thus, BTSs 110 and 112 transmit to MSs 132 and 134 using overlay transmissions on the forward link in cells 122B and 124B, respectively. Moreover, MS 136 supports underlay transmissions while MS 138 supports only overlay transmissions. Thus, BTS 114 transmits underlay transmissions to MS 136 on the forward link in cell 126A but transmits overlay transmissions to MS 138 on the forward link in cell 126B. In other embodiments some of the MSs may support both underlay and overlay transmissions, with either underlay or overlay transmissions provided to the MSs based upon system loading and other operating considerations.

Figure 1B:
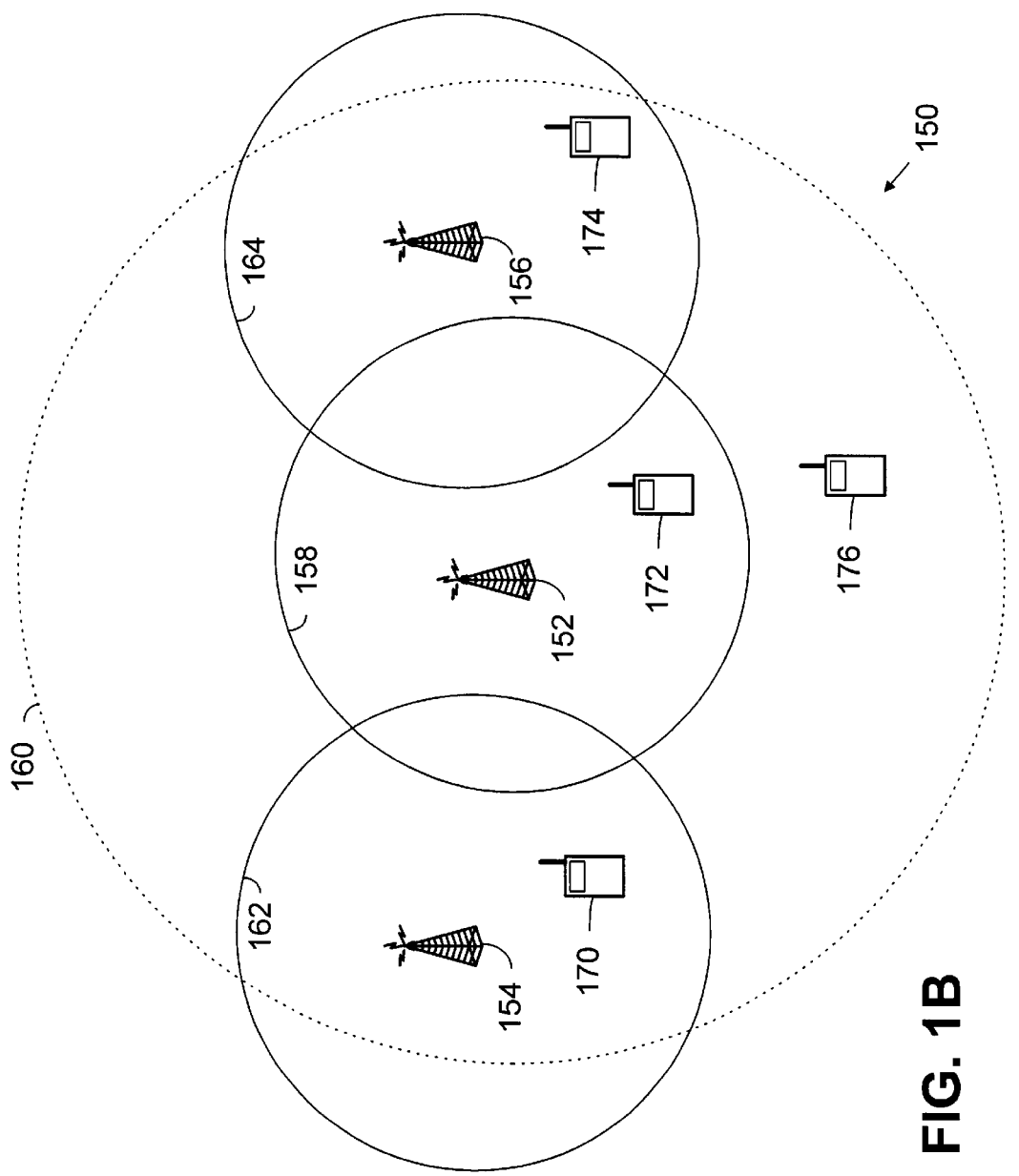
FIG. 1B is a system diagram illustrating an alternate embodiment of a CDMA cellular system in which an overlay cell extends beyond the boundaries of a respectively serviced underlay cell.

FIG. 1B is a system diagram illustrating an alternate embodiment of a CDMA cellular system 150 in which the boundaries of an overlay cell 160 extend beyond the boundaries of a respectively serviced underlay cell 158. As shown, BTSs 152, 154 and 156 provide wireless service within the service area. BTSs 152, 154 and 156 provide underlay service in cells 158, 162 and 164, respectively. BTS 152 also provides overlay service in cell 160 which services a substantially larger area that does cell 158. According to the present invention, not all base stations need be modified to provide overlay service. Some of the BTSs may provide only underlay transmissions while others may provide both underlay and overlay transmissions. In an example of operation in such a system, MSs 170, 172 and 174 receive underlay transmissions while MS 176 receives overlay transmissions.

Figure 1C:
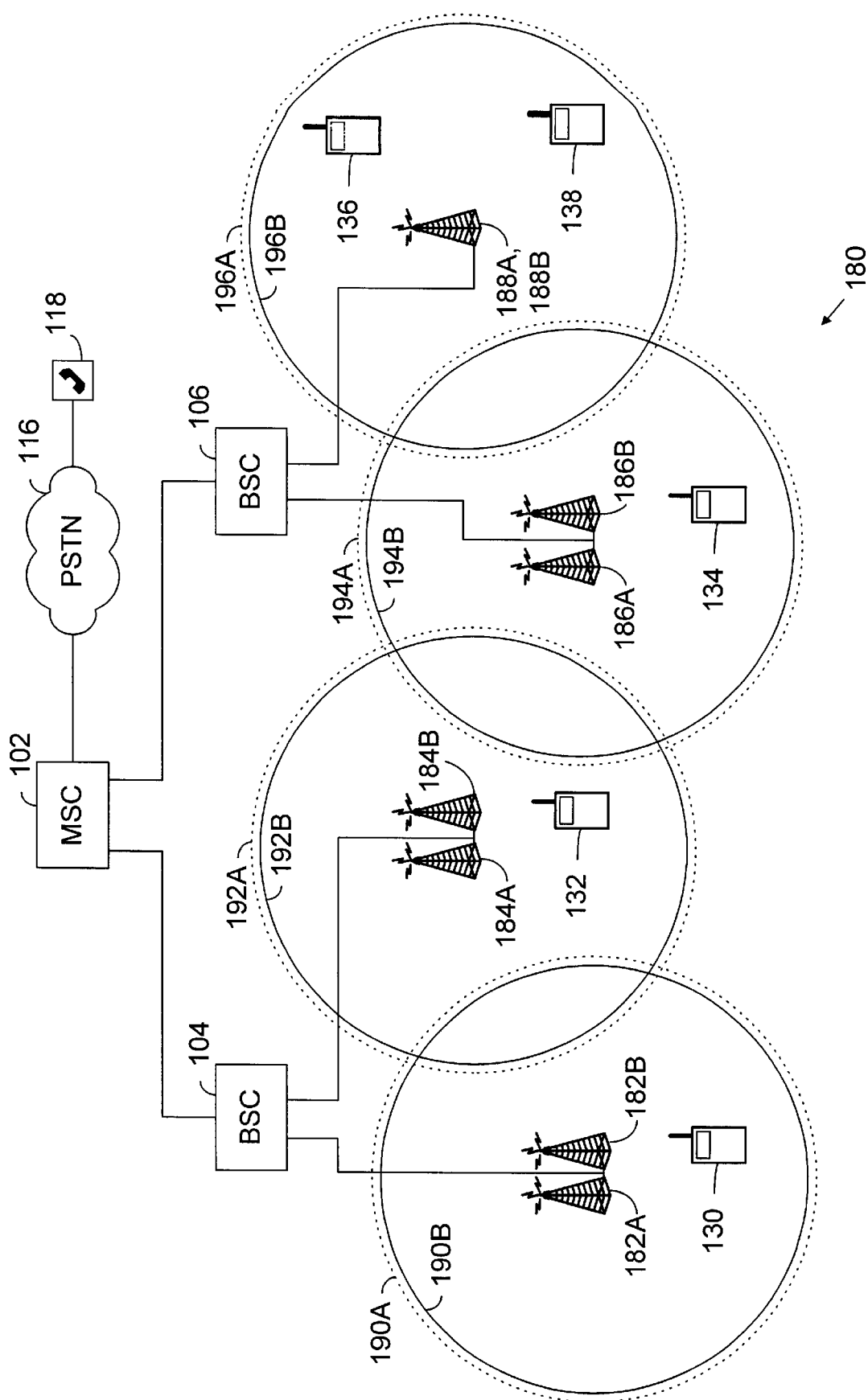
FIG. 1C is a system diagram illustrating another embodiment of a CDMA cellular system in which underlay transmissions and overlay transmissions are provided by separate base stations.

FIG. 1C is a system diagram illustrating another embodiment of a CDMA cellular system 180 in which underlay transmissions and a overlay transmissions are serviced by separate base stations. Components of the system 180 illustrated in FIG. 1C having reference numerals coinciding to components of the system described with reference to FIG. 1A have common function and will not be described again with reference to FIG. 1C.

BTSs 182A, 184A and 186A support underlay transmissions in cells 190A, 192A and 194A, respectively. Further, BTSs 182B, 184B and 186B support overlay transmissions in cells 190B, 192B and 194B, respectively. As shown, these BTSs provide transmissions in overlaying cells but require separate structures to do so. However, BTSs 188A and 188B provide underlay and overlay service in cells 196A and 196B while sharing a single base station. Thus, as is evident upon inspection of FIGS. 1A, 1B and 1C, CDMA cellular systems may be constructed in differing manners to support underlay and overlay communications according to the present invention.

Figure 1D:
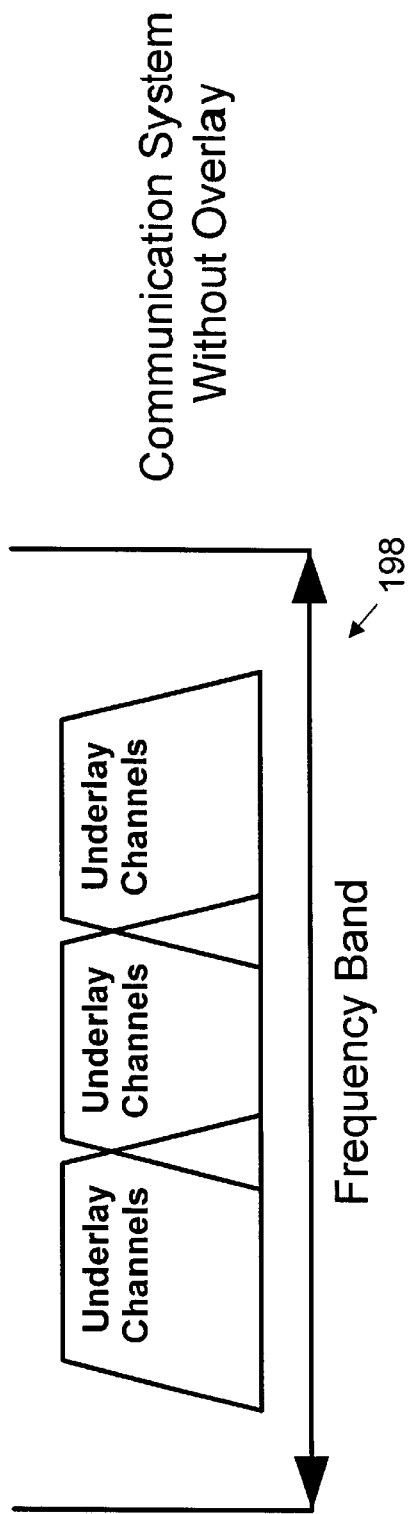
FIG. 1D illustrates a frequency spectrum occupied by a communication system supporting multiple underlay carriers.

FIG. 1D illustrates frequency spectrum occupied by a communication system in which underlay transmissions are conveyed by three carriers, each separated in frequency. For CDMA, each carrier occupies a bandwidth approximately given by the chip rate of the spread spectrum system. Thus, the spectrum of each underlay carrier is defined by the respective chipping rate. Multiple communications channels are supported within the spectrum of each carrier.

Figure 1E:
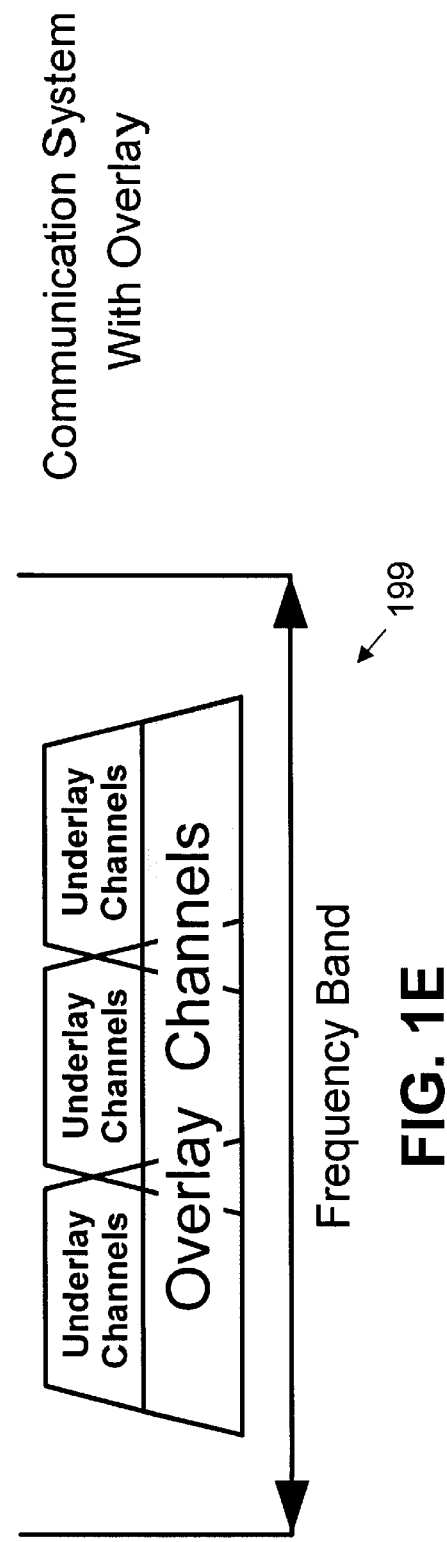
FIG. 1E illustrates a frequency spectrum occupied by a communication system having multiple underlay carriers and a single overlay carrier.

FIG. 1E illustrates frequency spectrum occupied by a communication system which includes three adjacent underlay carriers and a overlay carrier. The overlay carrier occupies three times the bandwidth of the underlay carriers and shares the spectrum with the three underlay carriers. To achieve this three time bandwidth, the overlay transmissions employ a chipping rate three times as great as the chipping rate of that employed on the underlay transmissions and have a carrier frequency coinciding to the carrier frequency of the center underlay carrier.

The default method for overlay is non-orthogonal overlay. In non-orthogonal operation, the total energy of the overlay signal interferes with the underlay signal and effectively decreases the available signal-to-noise ratio (SNR) of the underlay system. Similarly, the total energy of the underlay signal interferes with the overlay signal, which effectively decreases the SNR of the overlay system.

For the case of partial orthogonal overlay, the system is designed to lessen the impact of interference from the overlay to the underlay system and vice versa. For this method, a portion of the energy from the overlay signal is orthogonal to that of the underlay signal. This lessens the impact on SNR with respect to non-orthogonal overlay. Similarly, a portion of the energy from the underlay signal is orthogonal to that of the overlay signal, which lessens the impact on SNR for the overlay signal with respect to non-orthogonal overlay.

For the case of orthogonal overlay, all (or nearly all) the energy from the overlay signal is orthogonal to that of the underlay signal. For this method, the SNR of the underlay signal is not changed relative to the non-overlay system. Similarly, all (or nearly all) the energy from the underlay signal is orthogonal to that of the overlay signal, and the SNR of the overlay signal is unchanged relative to that for the case of the non-overlay system. Although this method is highly attractive from the perspective of maintaining orthogonality between overlay and underlay systems, there are other significant issues due to spectral characteristics, which result from the design of the orthogonal overlay method.

Figure 2A:
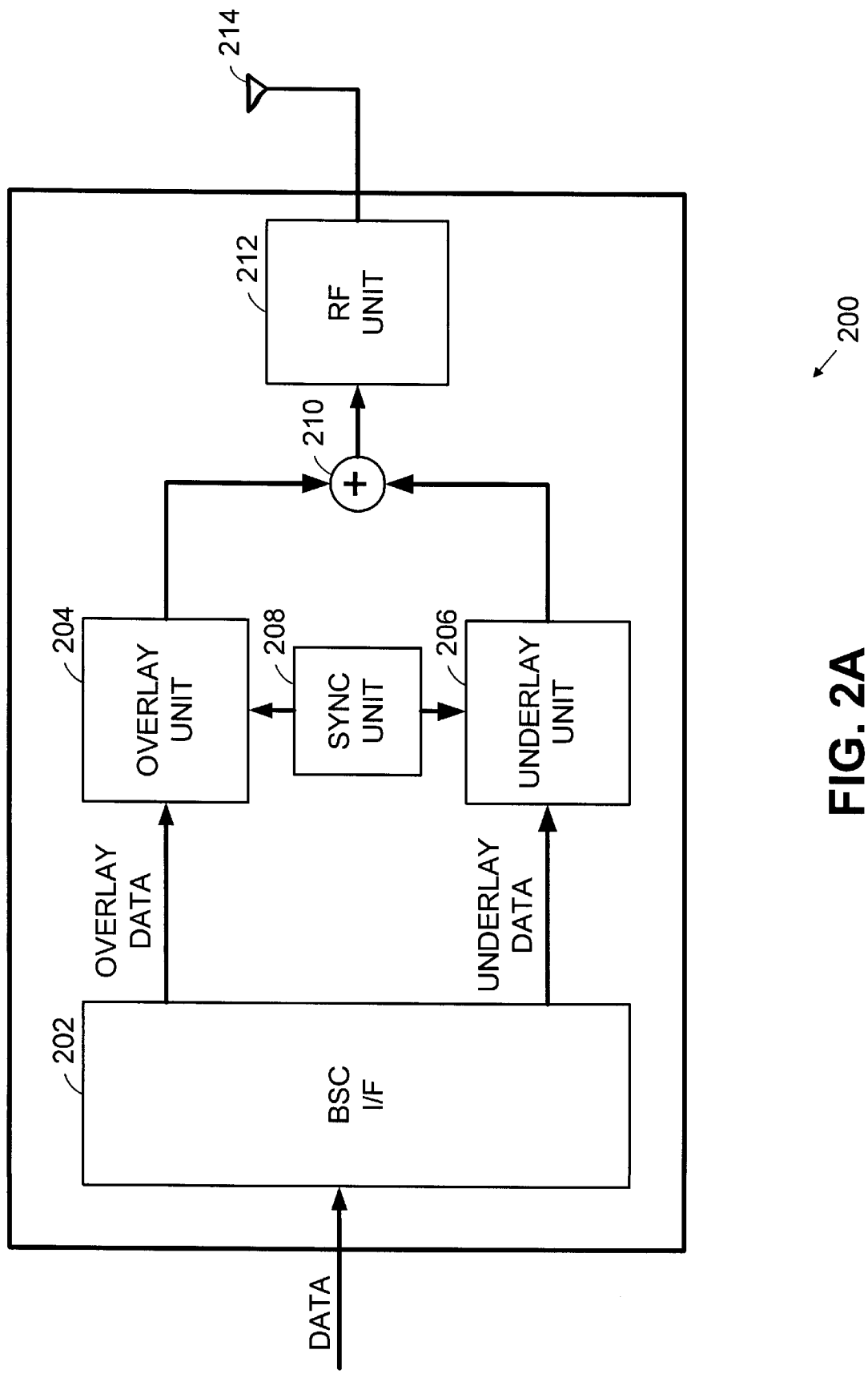
FIG. 2A is a block diagram which illustrates, generally, construction of a portion of a base station according to the present invention which supports both an underlay system and an overlay system.

FIG. 2A is a block diagram which illustrates, generally, construction of a base station 200 (of BTS) according to the present invention which supports overlay. The base station 200 includes a BSC interface (I/F) 202 that interfaces the overlay unit 204 and the underlay unit 206 to a coupled BSC (such as in the construction illustrated in FIG. 1A). The BSC I/F 202 divides data received from the BSC into overlay data and underlay data based upon whether the data will be transmitted via overlay transmissions or underlay transmissions. The underlay data is received from the BSC I/F 202 by an underlay unit 206 and processed according to the CDMA protocol standard employed to produce underlay transmissions. Further, the overlay data is received by an overlay unit 204 and processed according to the present invention to produce overlay transmissions that are at least partially orthogonal to the underlay transmissions. A synchronization unit 208 couples to both the overlay unit 204 and the underlay unit 206 so that the overlay transmissions and underlay transmissions are produced with the desired orthogonality.

The overlay transmissions and the underlay transmissions are combined at summing unit 210 to produce a composite signal that is sent to a radio frequency (RF) unit 212. The RF unit performs RF modulation on the received signal and transmits the composite signal via antenna 214 on the forward link. As will be appreciated, the particular construction illustrated in FIG. 2A does not show other systems commonly present in a BTS or base station that are generally known but are not required to illustrate the principles of the present invention.

Figure 2B:
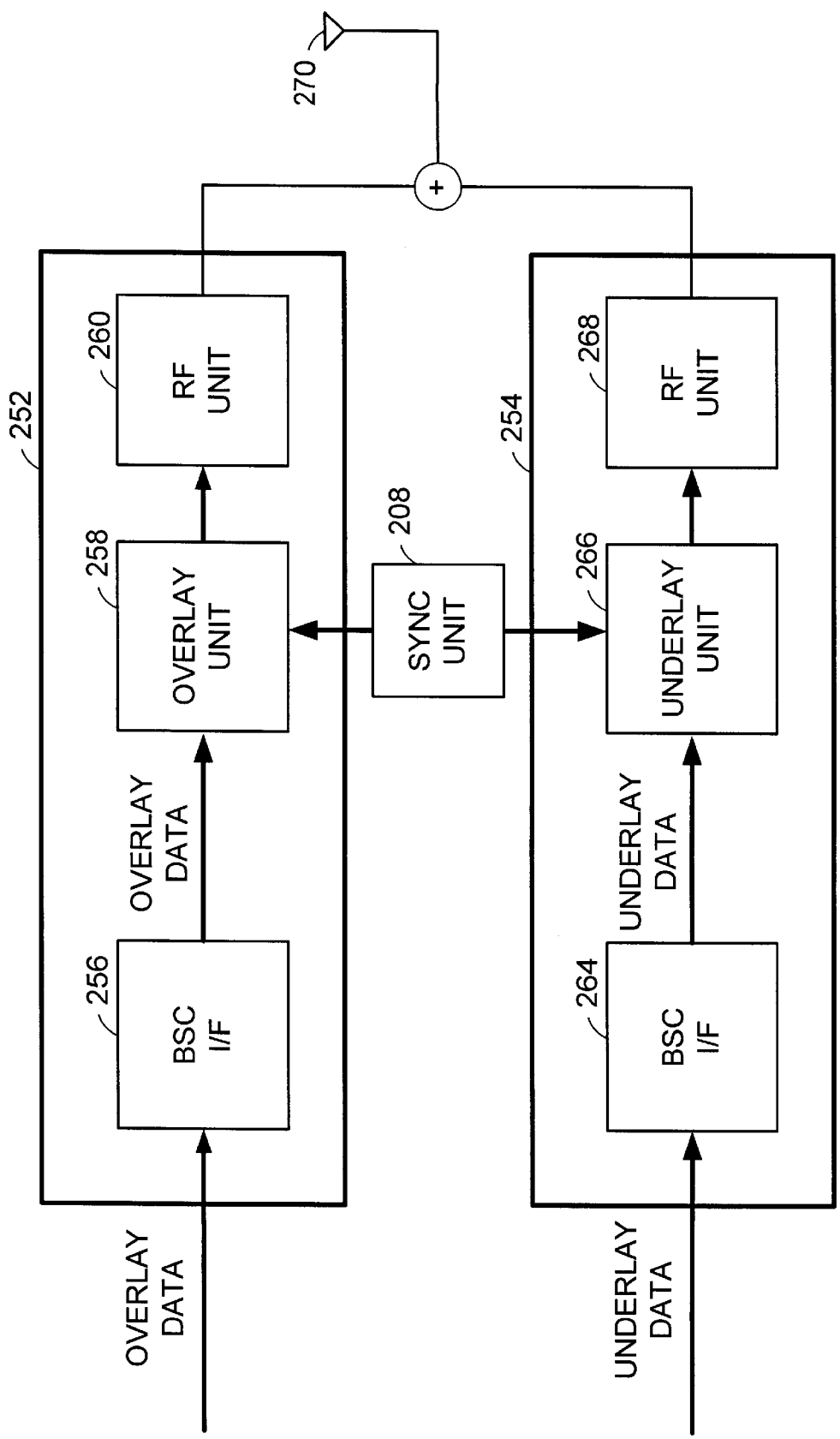
FIG. 2B is a block diagram which illustrates, generally, construction of a base station (or multiple base stations) according to the present invention which support both an underlay system and an overlay system.

FIG. 2B illustrates construction of a base station, or multiple base stations according to the present invention which support overlay. As is shown, an overlay base station unit 252 resides separate from an underlay base station unit 254. While the overlay base station unit 254 and the overlay base station unit 252 may reside within a single BTS such as BTSs 108–114 illustrated in FIG. 1A, the overlay base station unit 254 and the overlay base station unit 252 may reside in separate BTSs, such as BTS 182A and 182B illustrated in FIG. 1C. Thus, the construction of FIG. 2B illustrates how overlay transmissions and underlay transmissions may be generated by independent units but maintain orthogonality. Transmission via a common antenna is preferred to minimize the orthogonality loss that will result due to multipath fading.

Underlay base station unit 254 receives underlay data via BSC interface (I/F) 264. The BSC I/F 264 couples to an underlay unit 266 which receives the underlay data and processes the underlay data to produce the underlay transmissions which are received by an RF unit 268 and transmitted on the forward link via antenna 270. The overlay base station unit 252 receives the overlay data via BSC I/F 256. The BSC I/F 256 couples to a overlay unit 258 which receives the overlay data. The overlay unit 258 and the underlay unit 266 also couple to a synchronization unit 208. The synchronization unit 208 provides synchronization signals to the overlay unit 258 and the underlay unit 266. Based upon the synchronization signals, the overlay unit 258 may produce the overlay transmissions such that they are at least partially orthogonal to the underlay transmissions. The overlay transmissions are received by an RP unit 260 and transmitted on the forward link via antenna 270.

Figure 3:
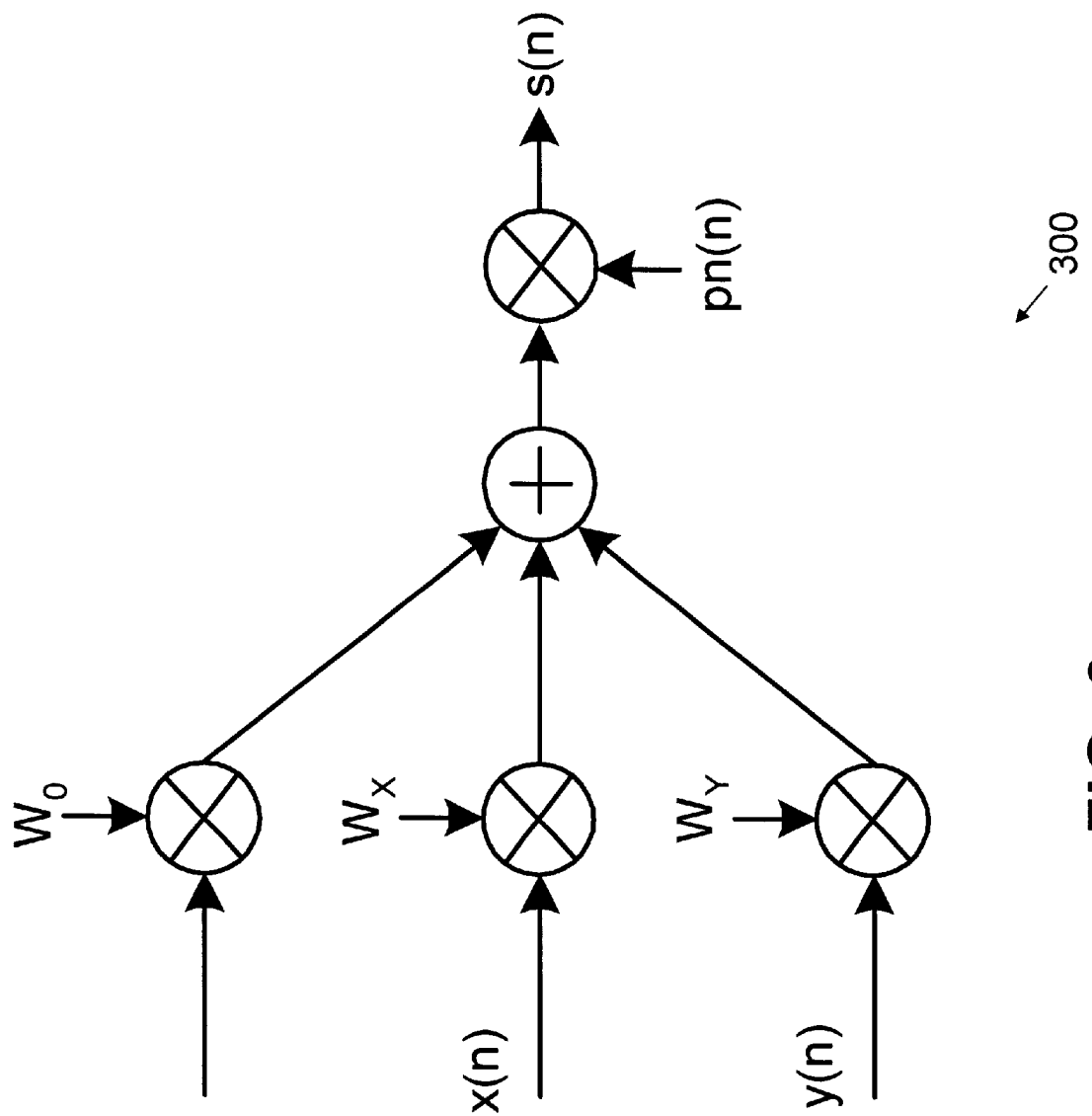
FIG. 3 is a diagram which illustrates operations according to the present invention in spreading data signals with Walsh codes and pseudo noise (PN) sequences.

FIG. 3 is a diagram which illustrates operation according to the present invention in spreading data signals with Walsh codes and pseudo noise (PN) sequences. In CDMA systems, the data of each user is encoded such that it is orthogonal to that of other users. Typically, this is realized with a method as shown in FIG. 3. Three code channels: a pilot channel, which contains no information and is sent with all 1's; code channel X which contains the signal x(n); and code channel Y which contains the signal y(n) are operated upon. Each code channel modulates a Walsh function, i.e., $W_0$, $W_x$, and $W_y$, corresponding to the Pilot channel, channel X, and channel Y, respectively. After the Walsh coding (i.e., modulation of the Walsh functions) the code channels are combined (i.e., summing operation following modulation of Walsh codes).

Next, the signal is spread by a Pseudo Random (PN) code. In general, the signals x(n) and y(n) can be complex as well as the PN sequence used for PN spreading. In an actual system, the resulting signal, s(n), is filtered, frequency modulated, amplified, and transmitted on an antenna. Because these operations are generally known, they will not be further described herein.

The use of Walsh codes effectively provides orthogonality between the forward link channels. Walsh codes have a special property whereby correlation of any Walsh code with any other Walsh code, except itself, is zero. This property is expressed in Equation 1

$$\sum_{n=0}^{N-1} W_i(n) \oplus W_j(n) = \begin{cases} 0, & i \neq j \\ N, & i = j \end{cases} \quad \text{Equation 1}$$

where $\oplus$ represents the exclusive or operation (i.e., modulo 2 addition), N is the length of the Walsh code, and the Walsh code bits consist of 1's and 0's (1's and −1's after mapping to I and Q channels, whereby the operation becomes multiplication). Codes with such properties are by definition orthogonal.

Figure 4:
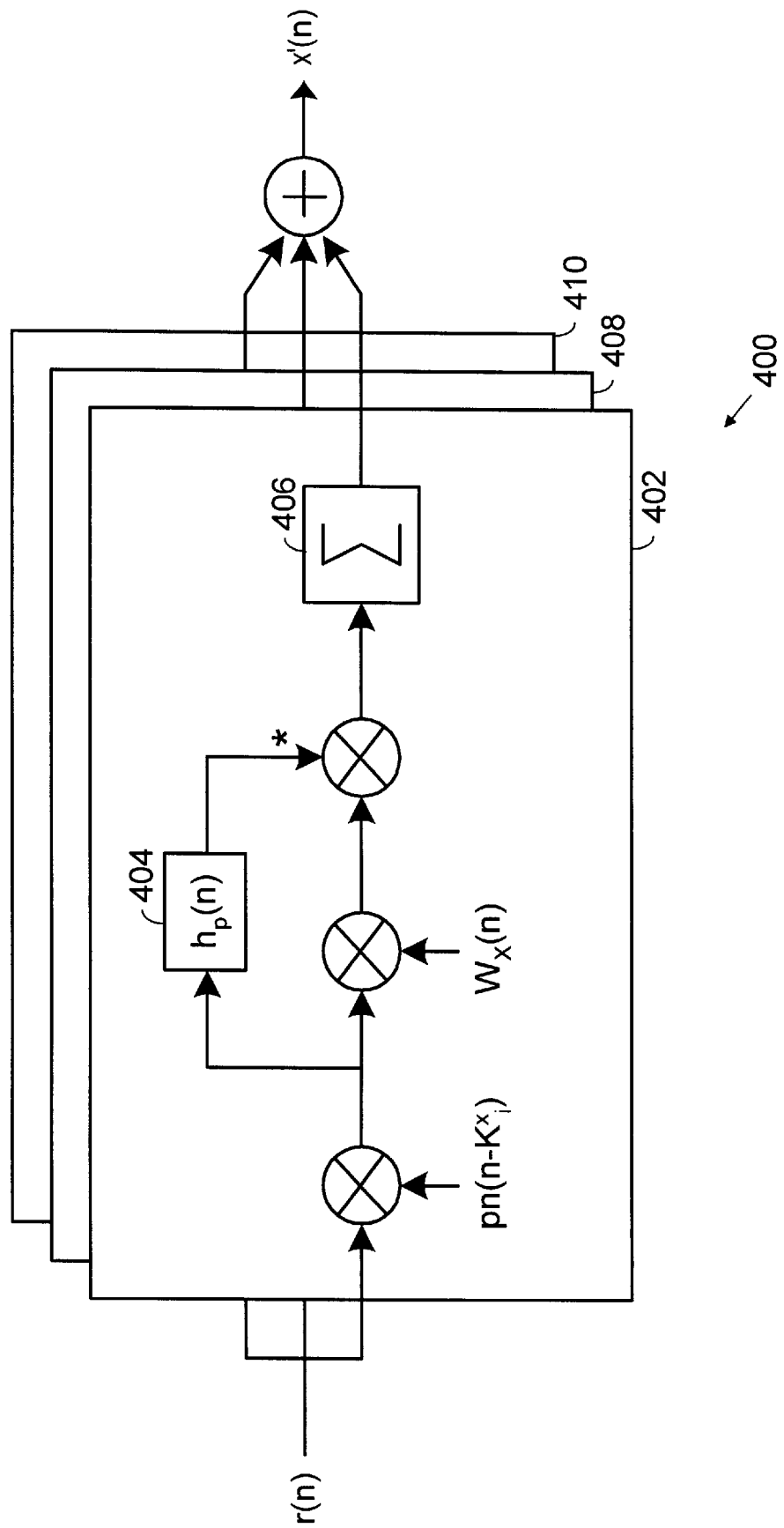
FIG. 4 is diagram illustrating construction of a rake receiver according to the present invention.

FIG. 4 illustrates an underlay receiver 400 corresponding to a MS illustrated in FIGS. 1A, 1B or 1C. The signal s(n), illustrated in FIG. 3, is sent over the air via a communications channel and is subject to multipath fading and the addition of noise. The resulting signal is r(n). The receiver 400 which operates upon the signal s(n) after frequency demodulation, filtering, and sampling, typically performed by an RF unit, is known as a Rake receiver. The object of such a Rake receiver is to gather signal energy on several "fingers" from the multitude of paths that result in a mobile channel. Operation of the Rake receiver is analogous to the operation of a simple garden rake.

Assume that the Rake receiver 400 corresponds to user X. Each Rake finger 402, 408 and 410 correlates the signal with the appropriate PN sequence, which is delayed in time according the i-th path of signal X (i.e., $K^x_i$). In general, the PN sequence and received signal are complex quantities. Next, the signal is correlated with the Walsh code of path X, $W_x(n)$. The filter $h_p(n)$ 404 is the channel filter and the * operation indicates complex conjugate operation. After phase and gain correction (i.e., multiplication with the conjugate of the filter output), the resulting signal is summed to produce signal x'(n). The operations performed by the Rake receiver 400 effectively implement Equation 1, in addition to multipath combining and despreading.

For a communications channel consisting of one multipath, all Walsh channels except $W_x(n)$ are orthogonal, and thus are eliminated. For channels consisting of more than one path, then within each path, orthogonal channels are eliminated. However, interpath interference is not eliminated. In general, orthogonal spreading, eliminates inter channel interference within one multipath.

Suppose that at the receiver 400 the ratio of total transmit power spectral density (i.e., all channels) from the base station to other cell interference spectral density, $I_{oc}$, is specified by a parameter $G = I_{or}/I_{oc}$. The parameter G is designated "geometry" since there is a correlation between the distance from the cell (i.e., base station) and the geometry, G. A geometry of 8-dB, for example, indicates a location close to the cell since the energy from the cell in which the mobile station resides, $I_{or}$, is 8-dB stronger than the other cell interference, $I_{oc}$. A geometry of 0-dB indicates a location further from the cell since the other cell interference is equally as strong as the energy received from the base site. The SNR at the mobile receiver is given in Equation 2 by $$SNR = \frac{E_c}{I_{oc} + \sigma_I^2} \quad \text{Equation 2}$$

where $E_c$ is the energy per chip of the respective Walsh channel and $\sigma_I^2$ is interference due to loss of orthogonality, and it is assumed that $I_{oc}$ includes thermal noise. By substituting in the definition for geometry and rearranging, Equation 3 is produced as $$SNR = \frac{GE_c/I_{or}}{1 + \frac{\sigma_I^2 G}{I_o}} \quad \text{Equation 3}$$

For a system without overlay, $\sigma_I^2 = 0$ in which case the SNR is given by $$SNR = GE_c/I_{or} \quad \text{Equation 4}$$

Equation 4 is the baseline to which performance of the overlay methods of the present invention are to be compared. Since CDMA system capacity is proportional to the SNR, a comparison of performance of a system constructed according to the present invention to a system operating according to Equation 4 provides a measure of the relative performance with respect to capacity.

The total passband transmit signal s(t) is comprised of an underlay part and overlay part, which is described in Equation 5 as $$s(t) = Re\left\{\sum_n \sum_k x^u(n,k) h^u(t - nT_c^u) e^{j2\pi f_k t} + \sum_n x^o(n) h^o(t - nT_c^o) e^{j2\pi f_c t}\right\} \quad \text{Equation 5}$$

where a u superscript corresponds to the underlay system, an o superscript corresponds to the overlay system, $f_k$ is the carrier frequency of the k-th underlay carrier, $f_c$ is the carrier frequency of the overlay carrier, x(n) is the composite signal on the corresponding carrier frequency, h(t) is the transmit filter, and $T_c$ is the chip interval of the corresponding system. For the underlay and overlay systems, respectively, the composite signal, x(n), after spreading, is given in Equation 6 as $$x^u(n,k) = \sum_{n_{user}^{k,u}} b_{n_{user}^{k,u}}\left(\left\lfloor \frac{n}{N_c^u} \right\rfloor\right) w_{n_{user}}(n\%N_c^u) p^u(n), \quad \text{Equation 6}$$

$n_{user}^{k,u} \in \{\text{underlay users}\}$ $$x^o(n) = \sum_{n_{user}^o} b_{n_{user}^o}\left(\left\lfloor \frac{n}{N_c^o} \right\rfloor\right) w_{n_{user}}(n\%N_c^o) p^o(n), \quad \text{Equation 7}$$

$n_{user}^o \in \{\text{overlay users}\}$, where $b_{n_{user}}$(i) is i-th coded information symbol of user $n_{user}$, $\lfloor x \rfloor$ designates the integer part of x, $N_c$ is the number of chips per information symbol, $W_{n_{user}}$(i) is the i-th Walsh bit of the Walsh code assigned to user $n_{user}$, % indicates the modulo division, and p(n) is the n-th PN chip.

Figure 5:
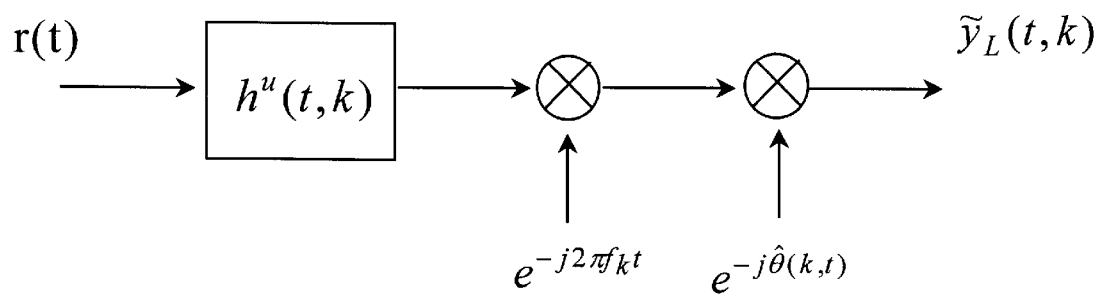
FIGS. 5 and 6 are diagrams illustrating signal processing operations according to the present invention.

A simplified model of the receiver filter and phase correction for the underlay receiver is illustrated in FIG. 5. The input, r(t), is the received signal and includes the transmitted signal s(t) after multipath fading and addition of background noise. The received signal r(t) is filtered by the underlay receiver filter, which is centered on the underlay carrier corresponding to the desired channel. The subsequent operations illustrated in FIG. 5 represent frequency demodulation and phase correction.

After phase correction, the noiseless baseband equivalent received signal is given by $$\tilde{y}_L^u(k,t) \approx \sum_p \sum_n \alpha(p, f_k, t) x^u(n, k) h^{uu}(t - nT_c^u - \tau_p) +$$
$$\sum_p \sum_n \alpha(p, f_c, t) x^o(n) h^{ou}(t - nT_c^o - \tau_p) e^{j2\pi(f_c - f_k + f_{dc} - f_{dk})(t - \tau_p)}$$

Equation 8 where $h^{uu}(t)$ is the combined underlay transmitter and receiver pulse, which we assume to be Nyquist, $h^{ou}(t)$ is the combined transmit filter for the overlay system and receiver filter of the underlay system, and $\alpha(p,f_i,t)$ represents a complex fading process on the p-th multipath system on the carrier centered at $f_i$, and time t. For an underlay receiver which is centered with the overlay carrier, sampling at the underlay chip rate, and adjusting for the sampling phase, the received signal decomposes into and underlay part and overlay part as follows $$\tilde{y}_L^u(k, mT_c^u + \tau_p) = \sum_p \alpha(p, f_k, mT_c^u + \tau_p) x^u(m, k) +$$
$$\sum_p \sum_n \alpha(p, f_c, mT_c^u + \tau_p) x^o(n) h^{ou}(mT_c^u - nT_c^o) e^{j\phi(mT_c^u, k)}.$$

Equation 9

The last summation of Equation 9 represents interference from the overlay system to the underlay system due to inter-chip interference (ICI). In general the summation over n is infinite; however, in practical systems the summation is finite. If the signaling pulse $h^{ou}(t)$ was Nyquist then all samples, $t=iT_c^u$, would be zero, with the exception of i=0. For practical systems the combined pulse, $h^{ou}(t)$, will mostly be determined by the underlay filter, since it is narrowband compared to the overlay filter. Then, the dominant terms in the summation correspond to the non-zero portion of the underlay transmit filter.

In considering the overlay system to underlay system interference, inter-carrier interference must be considered for all interaction. For example, a system with three underlay carriers per overlay carrier would result in three dominant ICI terms for every underlay chip. For such a system, the dominant terms correspond to n=m−1, n=m, and n=m+1, where the center term (i.e., n=m) corresponds to the largest term. Also, note that filtering the overlay input with the underlay filter rejects approximately ⅓ the energy of the overlay signal. For $f_k=f_c$ the phase term will be zero.

Figure 6:
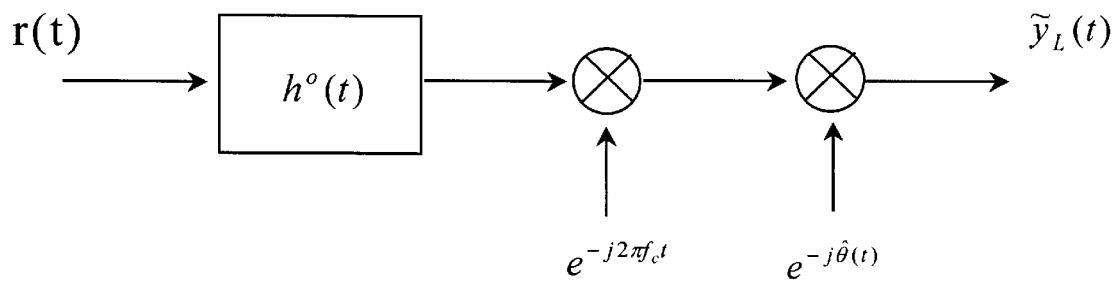

A simplified model of the receiver filter and phase correction for the overlay receiver is illustrated in FIG. 6. After phase correction, the noiseless baseband equivalent received signal is given in Equation 10 by $$\tilde{y}_L^o(k, t) \approx \sum_p \sum_k \sum_n \alpha(p, f_k, t) x^u(n, k)$$
$$h^{uo}(t - nT_c^u - \tau_p) e^{j2\pi[f_{dk}(t - \tau_p) - f_k \tau_p + (f_k - f_c)\tau_p]} +$$
$$\sum_p \sum_n \alpha(p, f_c, t) x^o(n) h^{oo}(t - nT_c^o - \tau_p),$$

Equation 10 where $h^{uo}(t)$ is the combined underlay transmitter and overlay receiver, and $h^{oo}(t)$ is the combined transmitter and receiver filter for the overlay system, which is assumed to be Nyquist. After sampling at the overlay chip rate, and adjusting for the sampling phase, the received signal decomposes into and underlay part and overlay part as follows in Equation 11.

$$\tilde{y}_L(k, mT_c^o + \tau_p) =$$
$$\sum_p \sum_k \sum_n \alpha(p, f_k, mT_c^o + \tau_p) x^u(n, k) h^{uo}(mT_c^o - nT_c^u)$$
$$e^{j\phi(mT_c^o, k)} + \sum_p \alpha(p, f_c, mT_c^o + \tau_p) x^o(m).$$

Equation 11

The first set of summations of Equation 11 represents interference from the underlay system to the overlay system. The second set of summations represents the desired signal (i.e., overlay signal). The desired signal consists of signals for many users each conveyed on an orthogonal Walsh channel. The underlay interference results from summation over n, which effectively samples the pulse, $h^{uo}(t)$, at the underlay chip rate; however, the pulse $h^{uo}(t)$, is mostly determined by the underlay transmit filter since the receiver filter is wideband relative to the underlay transmit filter. Effectively, this results in sampling the underlay filter K times per overlay chip, where K represents the number of underlay carriers. Also, the underlay term $x^u()$ remains fixed for K samples. For $f_k=f_c$ the phase term will be zero.

In an example of deriving operating parameters, the underlay system and the overlay system are considered. In the example, the underlay system consists of three carriers and the overlay system consisting of one wide band carrier equivalent in bandwidth to 3 times that of the underlay system (as shown in FIG. 1E). The capacity (i.e., spectral efficiency) of the direct spread radio technology, in the sense of bits/Hz, is C. Although the spectral efficiency is expected to increase somewhat with the bandwidth, for the purposes of explanation in derivation, it is reasonable to assume that the capacity is a linear function of bandwidth. Furthermore, it is reasonable to assume that the capacity for each system is proportional to the signal-to-noise ratio at the corresponding receivers.

With these assumptions, each system which is operated independently (without overlay) has a capacity of C. In overlay mode the total capacity of both systems (underlay+ overlay) is C, where each of the individual systems share the capacity of the combined system. Recall that the total transmit power from the base station is given by $I_{or}$. Finally, we designate the fraction of transmit power allocated to the overlay system as α.

For the case of non-orthogonal overlay, the underlay transmission acts as interference to the overlay system. Utilizing Equation 3, the SNR of the underlay system is given in Equation 12 as $$SNR^u = \frac{E_c}{I_{oc} + \sigma_I^2} = \frac{GE_c/I_{or}}{1 + \alpha \frac{G}{I_{or}}}.$$

Equation 12

For the overlay system, the SNR is given in Equation 13 as $$SNR^o = \frac{GE_c/I_{or}}{1 + (1-\alpha)\frac{G}{I_{or}}}.$$

Equation 13

As indicated by Equation 9, the overlay interference has one dominant term. For the partial orthogonal overlay method, the Walsh and PN structure of the overlay system is modified such that the dominant interference term is orthogonal to the underlay system.

Figure 7:
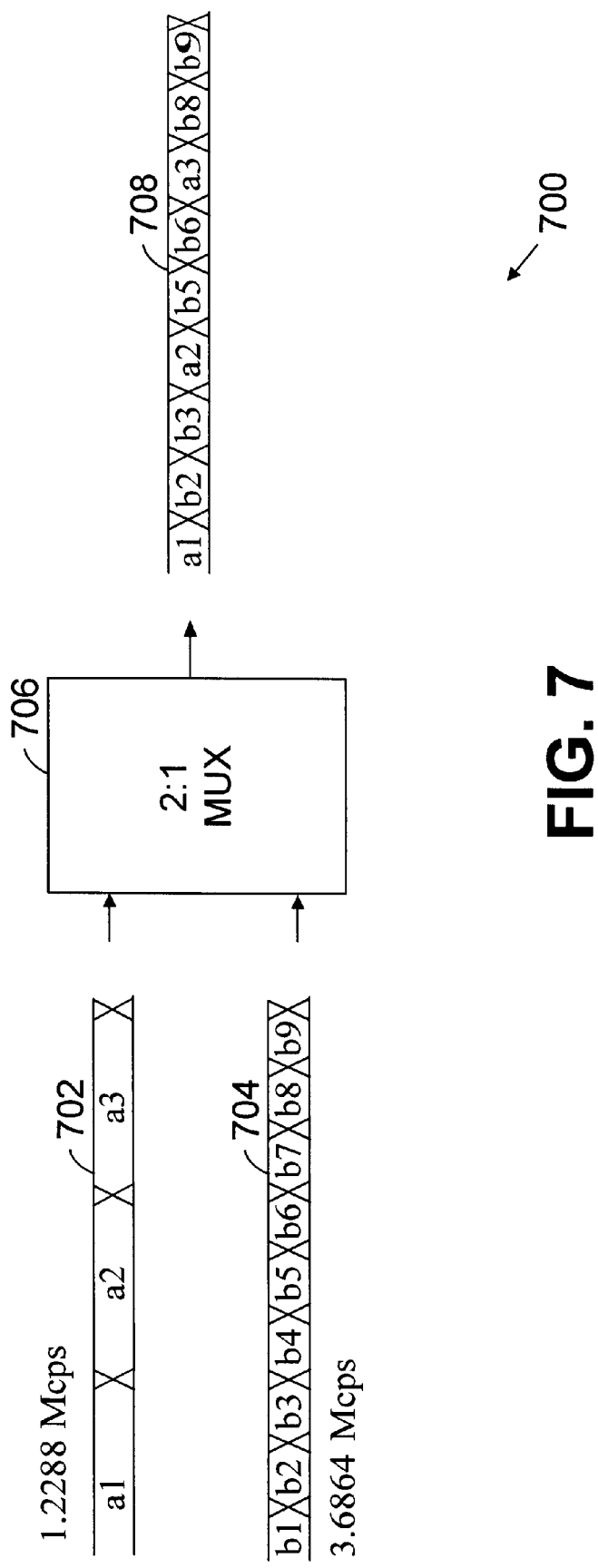
FIG. 7 is a diagram illustrating the manner in which an underlay PN sequence is punctured into overlay transmissions to produce partial orthogonality of the overlay transmissions in the underlay system.

FIG. 7 illustrates how, in partial overlay operation, the underlay PN sequence is punctured into the overlay PN sequence. As shown, an underlay PN sequence 702 at 1.2288 Mcps and an overlay PN sequence 704 at 3.6864 Mcps are input to a 2:1 multiplexer 706 to produce a punctured PN sequence 708 at 3.6864 Mcps. An additional requirement is that the combined coded information symbols (corresponding to the punctured PN chips), Walsh chips, and punctured PN chips of the overlay system appear just like the chips of another underlay receiver. This is accomplished by distributing the coded information symbols such that every three coded information symbol is sent consecutively with PN chips a1, a2, a3, . . . , and b2, b5, b8 . . . , and b3, b6, b9, . . . , respectively. By choosing the overlay Walsh code to be orthogonal with the underlay Walsh codes, at the underlay receiver, after correlating with the underlay PN sequence, the coded information symbols corresponding to a1, a2, a3, are orthogonal with the underlay Walsh code channels.

Mathematically, the encoding of the coded information symbols (for a three carrier overlay) with the Walsh codes can be described as a multiplication of each three coded information symbols with a Walsh code and interleaving according to Equation 14.

$$f([c1c2c3],w_n) \to [c_1 w_{n1} c_2 w_{n1} c_3 w_{n1} c_1 w_{n2} c_2 w_{n2} c_3 w_{n2} \cdots c_1 w_{nN} c_2 w_{nN} c_3 w_{nN}]$$

Equation 14

Essentially, each coded information symbol (scaler) multiplies an entire Walsh code (1×N vector) and the three resulting sequences of chips are interleaved. This operation can be implemented with a serial to parallel converter (P/S) followed by Walsh code multiplication, and then by parallel to serial conversion.

Figure 8:
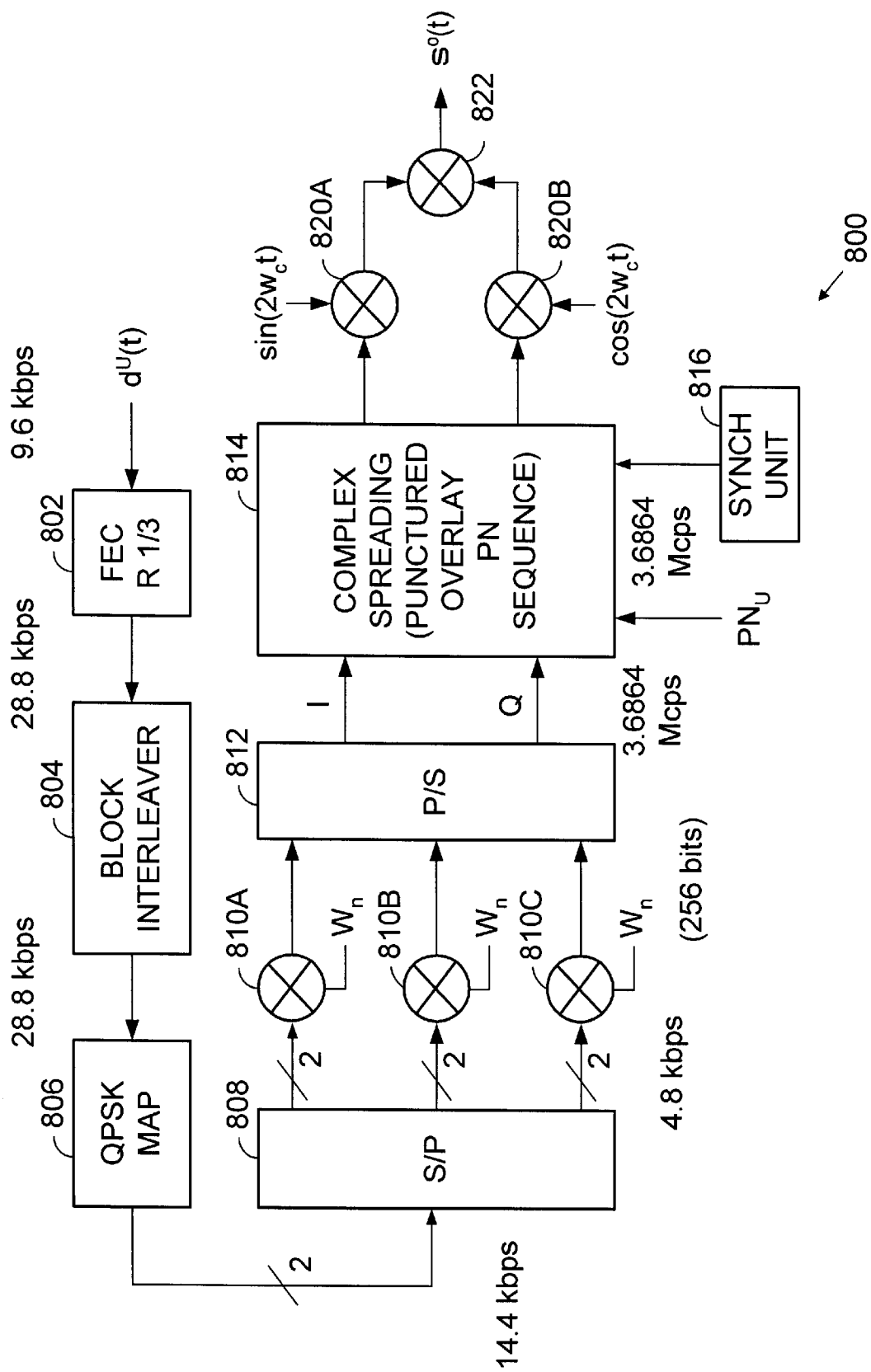
FIG. 8 is a block diagram illustrating an overlay transmitter constructed according to the present invention.

FIG. 8 illustrates an overlay transmitter 800 consistent with the previous description and designed according to three underlay channels which is compatible with a system as is illustrated in FIG. 1E. The user information bits $d^U(t)$ arrive at 9.6 kbps and are then input into a rate 1/3 forward error correction code (FEC) encoder 802 to produce output at 28.8 kbps. After QPSK mapping at block 806, the coded information symbols are converted to three parallel paths by a serial to parallel (S/P) converter 808 followed by modulation of a Walsh code as shown via modulators 810A, 810B and 810C. Walsh codes employed are 256-bit Walsh codes.

A parallel to serial (P/S) converter 812 then converts the parallel bit stream into a serial bit stream by consecutively interleaving one bit from each path. Such interleaving produces a resulting chip rate of 3.6864 Million chips per second (Mcps). Next, the signal is spread with the punctured overlay PN sequence by the complex spreading unit 814 by multiplying the signal by the overlay PN sequence which also arrives at the 3.6864 Mcps rate. Thus, output is produced by complex spreading unit 814 at the output chip rate of 3.6864 Mcps.

The signals are then modulated at 820A and 820B and combined at 822 to form the overlay signal $s^o(t)$. The S/P conversion, Walsh encoding and P/S conversion assures that the coded information symbols are properly aligned with the overlay and underlay PN chips, with synchronization provided by the synchronization unit 816.

At a receiver, the inverse S/P and P/S operations are performed. After correlating with the appropriate PN sequence, the portion of the overlay PN code that has been punctured is now descrambled ("uncovered") at the underlay receiver. By coding the overlay signal with a Walsh code that is orthogonal to an underlay Walsh code, this uncovered portion of the forward link transmission (the dominant interference terms) from the overlay system is orthogonal to the underlay codes.

The transmitter for a substantially orthogonal technique is similar to that shown in FIG. 8, however, each Walsh code on the parallel paths at blocks 810A, 810B and 810C is unique and the PN sequence consists of the underlay PN sequence. In order for the spectrum to cover all underlay carriers, the Walsh channels on the parallel paths must be unique. This latter point will have an impact on the available Walsh channels since the overlay transmitter will consume K Walsh channels for every user. For the underlay receiver, this overlay method has the benefit that the three dominant inference terms, according to Equation 9, cancel. However, other issues exist with respect to the spectrum of the resulting signal, multipath resolution, and receiver performance.

The overlay PN sequence consists of repeating each underlay PN chip three times with a chip rate of three times the underlay chip rate, according to Equation 15.

$$[p_1 p_1 p_1 p_2 p_2 p_2 p_3 p_3 p_3 \cdots]$$

Equation 14

This results in effectively using the underlay PN sequence and chip rate for overlay operations to produce a partially orthogonal overlay signal. Consequently the PN spreading only spreads the signal to that of the underlay system. The remainder of the spreading is obtained from the Walsh encoding. The Walsh encoding, for overlaying of three underlay channels, consists of multiplying a group of every 3 coded information symbols by a unique Walsh code followed by interleaving of each of the three resulting sequences. This is described by Equation 16.

$$f([c1c2c3],W_x,W_u,W_z) \to [c_1 w_{x1} c_2 w_{y1} c_3 w_{z1} c_1 w_{x2} c_2 w_{y2} c_3 w_{z3} \cdots c_1 w_{xN} c_2 w_{yN} c_3 w_{zN}]$$

Equation 16

In order to define rules for management of overlay and underlay Walsh codes some general properties of Walsh codes are first discussed. A Walsh code set, $W^M$ is defined by Equation 17 as:

$$W^M = \begin{bmatrix} w^M_{1,1} & w^M_{1,2} & \cdots & w^M_{1,m} & \cdots & w^M_{1,M} \\ w^M_{2,1} & w^M_{2,2} & \cdots & w^M_{2,m} & \cdots & w^M_{2,M} \\ \vdots & \vdots & & \vdots & & \vdots \\ w^M_{n,1} & w^M_{n,2} & & w^M_{n,m} & & w^M_{n,M} \\ \vdots & \vdots & & \vdots & & \vdots \\ w^M_{M,1} & w^M_{M,2} & & w^M_{M,m} & & w^M_{M,M} \end{bmatrix} = \begin{bmatrix} w^M_1 \\ w^M_2 \\ \vdots \\ w^M_m \\ \vdots \\ w^M_M \end{bmatrix};$$

Equation 17 where there are M Walsh codes in the set; each Walsh code in the set, $w_m^M$, is of length M; and each Walsh code bit, $w_{n,m}^M$, is a 1 or 0. When the Walsh code set, $W^M$, is generated beginning with $$W^2 = \begin{bmatrix} 0 & 0 \\ 0 & 1 \end{bmatrix},$$

Equation 18

M is a power of 2; and each Walsh code $W_m^M$ is orthogonal to another Walsh code $W_n^M$, when n≠m.

The set of Walsh codes is constructed with the well known Haddamard matrix, given by $$W^M = \begin{bmatrix} W^{M/2} & W^{M/2} \\ W^{M/2} & \overline{W}^{M/2} \end{bmatrix} \quad \text{Equation 19}$$

Note that the Walsh codes in the set $W^{M/2}$ are contained in the set $W^M$. Furthermore, any Walsh code in the set $W^M$ is of the form $$W_n^M = \begin{cases} [W_n^{M/2} \ W_n^{M/2}], & \text{for } 0 < n \le M/2 \\ [W_{n-M}^{M/2} \ \overline{W}_{n-M}^{M/2}], & \text{for } M/2 < n \le M, \end{cases} \quad \text{Equation 20}$$

where this form will determine the rules for selecting overlay and underlay Walsh codes for the partial orthogonal overlay and orthogonal overlay methods. For a non-orthogonal overlay method, there is no impact on Walsh codes to/from the overlay and underlay systems. The overlay system may use any Walsh code allowed for the overlay system. The underlay system may use any Walsh code allowed for the underlay system.

For the partial orthogonal overlay method and the substantially orthogonal overlay method, Walsh code sharing between the overlay and underlay systems is shown by way of example. In practice, many forms of the following example may arise. Suppose an overlay user is assigned a Walsh code of length M, where this Walsh code is constructed as previously described. Similarly, an underlay user is assigned a Walsh code of length M/2. As demonstrated below, with proper selection of overlay and underlay Walsh codes the overlay and underlay systems will benefit from the partial orthogonal overlay property. Suppose an underlay user is assigned Walsh code $W_m^{M/2}$, where $0<m>M/2$. Since the overlay Walsh codes are of the form of Equation 20, then any overlay Walsh code, $W_n^M$, where $n \ne m$ and $n \ne m+M$ is orthogonal to the $W_m^{M/2}$. The implication is that any Walsh code used by the underlay system eliminates two Walsh codes from use by the overlay system.

This relationship, between overlay and underlay Walsh codes, implies a method of coordinated Walsh code usage between the overlay and underlay system. In other words, if Walsh code m is in use by the underlay system, where $0<m \le M$, the overlay system may not use Walsh codes n=m or n=m+M. Conversely, if Walsh code n is in use by the overlay system, if $0<n \le M/2$ then Walsh code m=n may not be used by the underlay system; otherwise, if $M/2<n \le M$, then Walsh code m=n−M may not be used by the underlay system.

Assume that the underlay system employs Walsh codes of length 128. An overlay system with three underlay carriers and Walsh codes of length 256 may be applied. Suppose $N_w^u$ Walsh codes are in use. This then leaves $$N_w^o = M - 2N_w^u \quad \text{Equation 21}$$

Walsh codes for the overlay system. For example, if $N_w^u = 32$, then $N_w^o = 182$.

The relationship between overlay and underlay Walsh codes for the orthogonal overlay method is similar to that of the partial orthogonal overlay method. The difference comes from the orthogonal overlay method consuming three Walsh codes per overlay channel. In other words, 21 still applies, but for an overlay of three underlay carriers the number of overlay channels supported by the overlay system is $N_w^o/3$. For example, with $N_w^u = 32$, then $N_w^o = 182$, which would accommodate 182/3≈60 overlay channels.

For the substantially orthogonal overlay method, the coordination of Walsh codes between overlay and underlay users is as follows. For a three carrier overlay suppose that each overlay channel employs Walsh codes $w_{n1}^M$, $W_{n2}^M$, and $W_{n3}^M$. Then, if Walsh code m is in use by the underlay system, where $0<m \le M/2$, the overlay system may not use Walsh codes n1=m or n1=m+M, n2=m or n2=m+M, and n3=m or n3=m+M. Conversely, if Walsh codes n1, n2, and n3 are in use by the overlay system, if $0<n1 \le M/2$ then Walsh code m=n1 may not be used by the underlay system; otherwise, if $M/2<n1 \le M$ then Walsh code m=n1−M may not be used by the underlay system; if $0<n2 \le M/2$ then Walsh code m=n2 may not be used by the underlay system; otherwise, if $M/2<n2 \le M$ then Walsh code m=n2−M may not be used by the underlay system; and, if $0<n3 \le M/2$ then Walsh code m=n3 may not be used by the underlay system, otherwise, if $M/2<n3 \le M$ then Walsh code m=n3−M may not be used by the underlay system.

Figure 9:
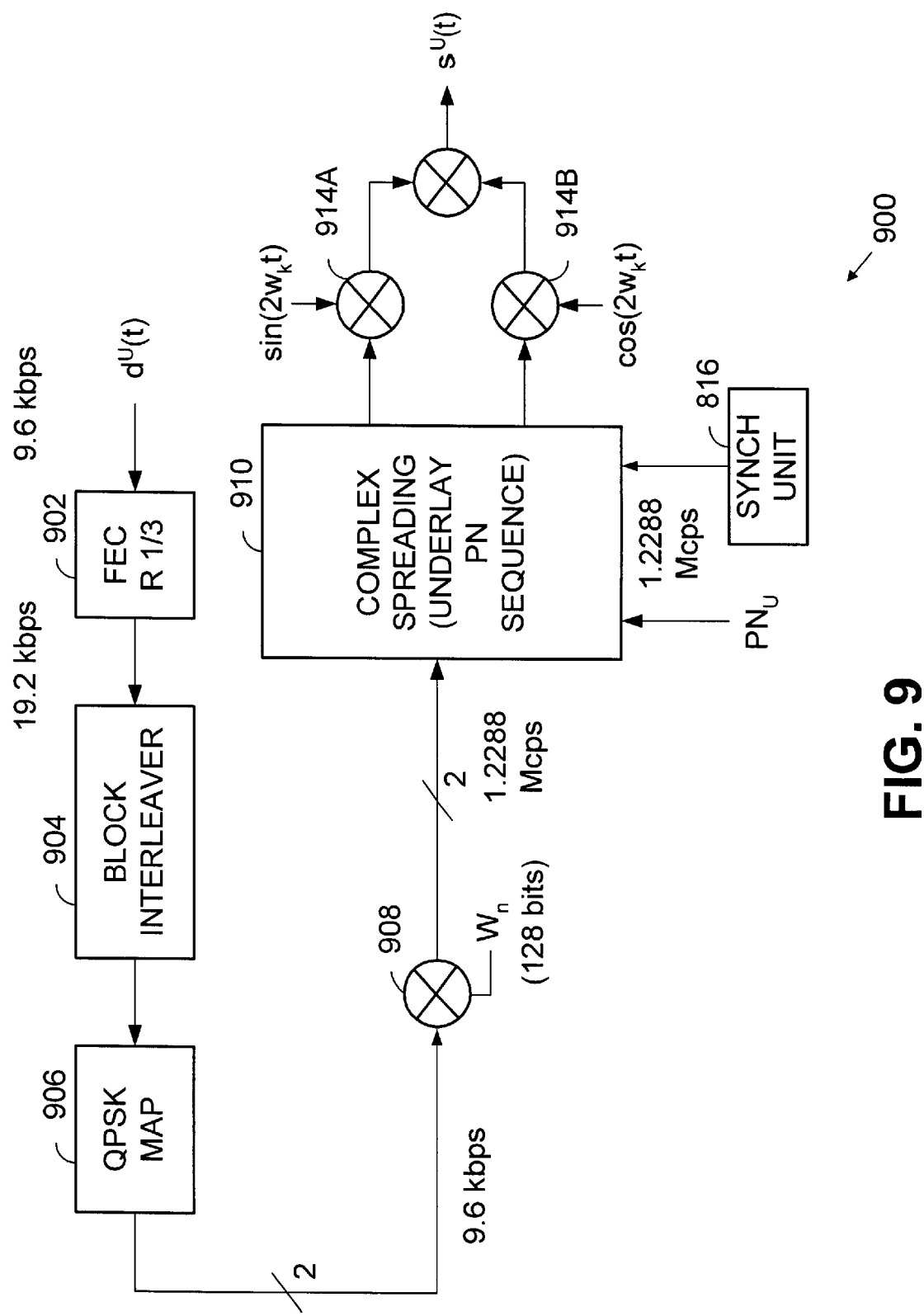
FIG. 9 is a block diagram illustrating an underlay transmitter constructed according to the present invention.

FIG. 9 illustrates an underlay transmitter 900 that may be used in conjunction with the overlay transmitter of FIG. 8. The underlay transmitter 900 shown corresponds to a system having three underlay carriers and one overlay carrier, since the overlay chip rate is three times that of the underlay chip rate. While the underlay transmitter 900 shown supports one underlay channel and the overlay transmitter 800 of FIG. 8 is shown to support one overlay channel for simplicity, an actual system will have a multitude of overlay channels on the overlay carrier, and a multitude of underlay channels on the underlay carrier.

The user information bits $d^U(t)$ arrive at 9.6 kbps and are then input into a rate ½ FEC encoder 902 to produce output at 19.2 kbps. The data is then interleaved by block interleaver 904 in order to protect against burst errors caused by multipath fading. After QPSK mapping at block 906, the symbol rate is 9.6 ksps. The information produced is then modulated with a 128-bit Walsh code at modulator 908, which results in a Walsh chip rate of 1.2288 Mcps. Next, the signal is spread by complex spreading unit 910 by the underlay PN sequence to produce an output chip rate of 1.2288 Mcps. Note that the synchronization unit 816 allows the complex spreading unit 910 to properly synchronize the overlay transmissions with the overlay transmissions. The signals are then modulated at 914A and 914B and combined to form the underlay signal $s^U(t)$.

An important requirement of the underlay transmitter 900 and the overlay transmitter 800 is that the overlay chip rate must be an integer multiple of the underlay chip rate. This requirement is satisfied in the example system shown in FIGS. 8 and 9 where the PN sequence clock of the overlay transmitter three times that of the PN sequence clock of the underlay transmitter, 3.6864 Mcps vs. 1.2288 Mcps.

Both the partial orthogonal overlay method and orthogonal overlay method require maintaining strict timing between the overlay and underlay system. For example, in order to establish orthogonality between the overlay and underlay systems, the timing of the overlay and underlay systems must be maintained to within a small fraction of a chip time. Otherwise, for example, when the timing of the underlay system and overlay system are misaligned by one chip or more the performance degrades to that of the Non-Orthogonal overlay method. The most straight forward method to maintain strict timing between the overlay and underlay system is for the overlay and underlay transmitters to be integrated into one base station unit such that the chip clock for both units is synchronized. In this way the timing between both systems (overlay and underlay) can be strictly maintained. However, as was illustrated in FIG. 2B, the overlay and underlay transmitters may reside in separate base station units if the strict timing is maintained between the base station units.

Figure 10:
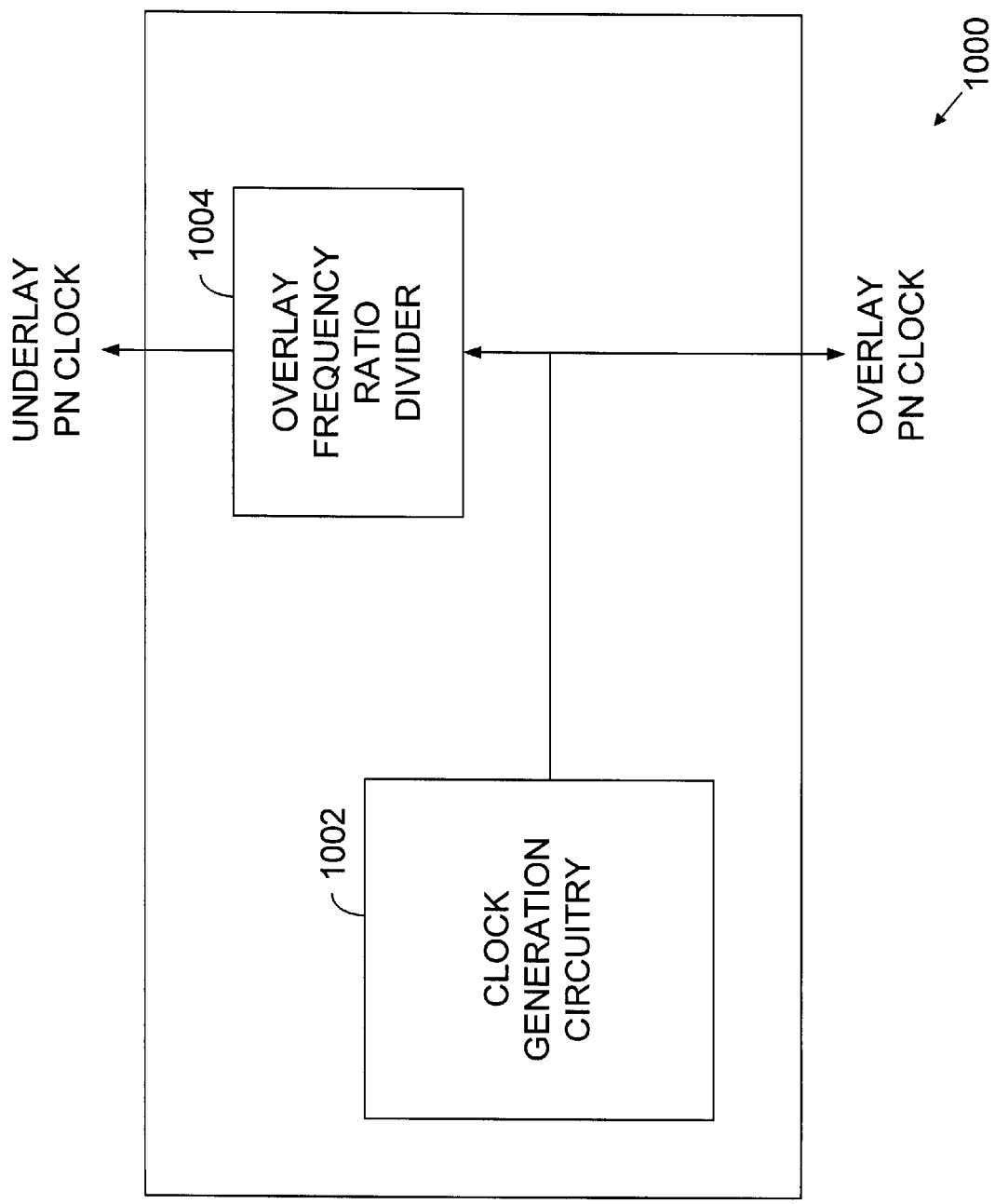
FIG. 10 is a block diagram illustrating a synchronization unit constructed according to the present invention.

FIG. 10 shows an example of construction of a synchronization unit 1000 according to the present invention. The synchronization unit 1000 includes clock generation circuitry 1002 that produces the PN overlay clock (e.g., the 3.6864 Mcps rate illustrated in FIG. 8). The PN overlay clock is received by the complex spreading unit 814 of FIG. 8 and the overlay frequency ratio divider 1004 of the synchronization unit. In the present example, the overlay frequency ratio divider 1004 divides the overlay PN clock by 3 to produce the underlay PN clock which is provided to the complex spreading unit 910 of FIG. 9.

Figure 11:
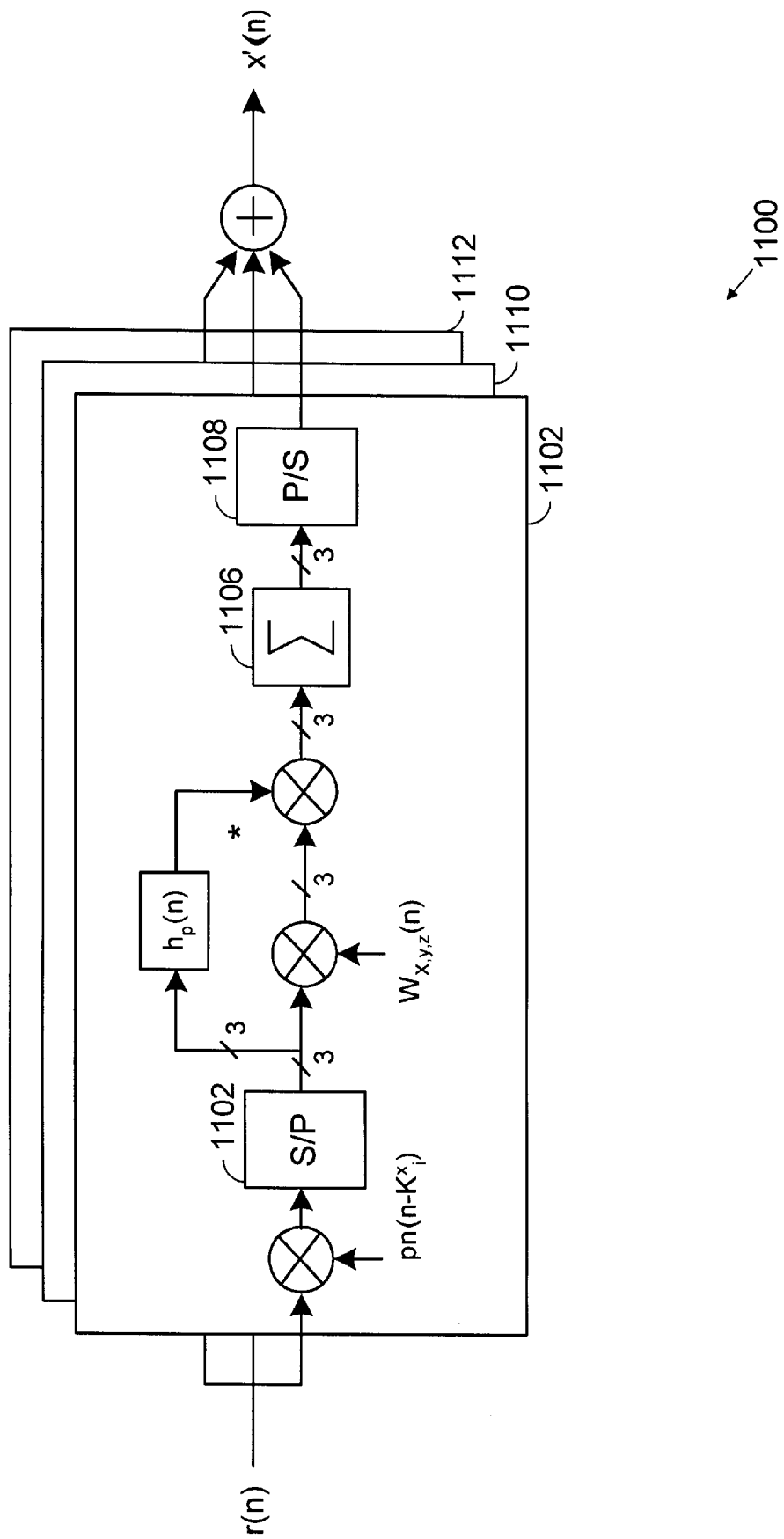
FIG. 11 is a diagram illustrating construction of a rake receiver according to the present invention which operates to receive overlay system transmissions.

FIG. 11 shows a Rake receiver 1100 of a mobile station constructed to receive transmissions and to despread the transmissions to extract overlay communications. For any of the overlay methods described herein, the mobile station corresponding to the underlay system requires no modification. However, a mobile station corresponding to the overlay system is designed to receive the signal transmitted by the overlay system. The mobile station also includes known components such as an RF unit coupled to an antenna (not shown). The Rake receiver 1100 couples to the RF unit and receives the input signal r(n). The output signal x'(n) produced by the Rake receiver 1100 is receives by additional processing equipment in the mobile station (not shown) used to complete the communication path. Because these other components are generally known, they will not be described further herein.

A first finger 1102 of the Rake receiver 1100 first correlates an input signal r(n) with the overlay PN code. For the case of the partial orthogonal overlay method, the overlay PN code is punctured with the underlay PN sequence. For the orthogonal overlay method the overlay PN code is exactly the underlay PN sequence. After correlation with the PN sequence via a PN sequence correlator, the signal is provided to a serial to parallel converter 1102 followed by correlation by the appropriate Walsh codes (i.e., corresponding to those used at the transmitter) using a Walsh code correlator, summation operation at summation block 1106 and then a parallel to serial operation at parallel to serial converter 1108. The produced signal is then combined with signals from other fingers 1110 and 1112 of the Rake receiver 1100 to produce x'(n).

Figure 12:
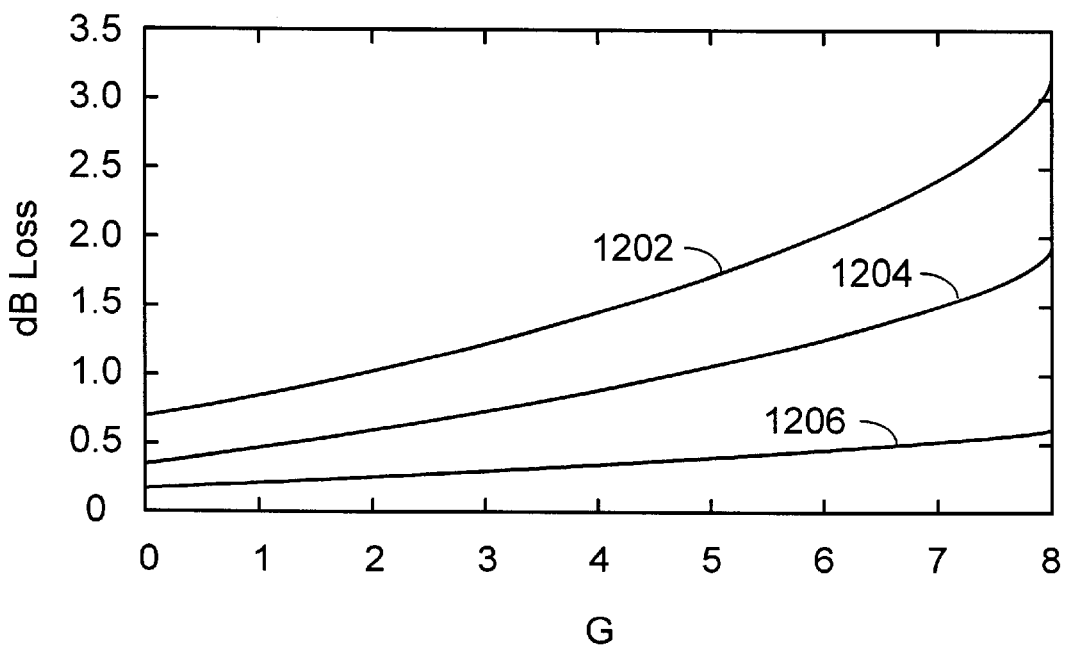
FIGS. 12 and 13 are diagrams illustrating performance of CDMA channels operating according to the present invention as compared to CDMA channels operating without benefit of the present invention.

FIG. 12 shows the performance of an underlay channel sharing a center frequency with and an overlay channel. Curve 1202 represents performance of the underlay channel in a non-orthogonal overlay system, curve 1204 represents performance of the channel in a partially orthogonal overlay system and curve 1206 represents performance of the channel in a fully orthogonal overlay system. For the overlay system, the transmitter and receiver filters were scaled to a bandwidth of three times the underlay filters. Performance is shown for the center overlay channel, i.e. without a frequency offset with respect to the overlay carrier. As indicated, substantial gains are obtained, with respect to non-orthogonal overlay, for both partial orthogonal and substantial orthogonal overlay operation.

Figure 13:
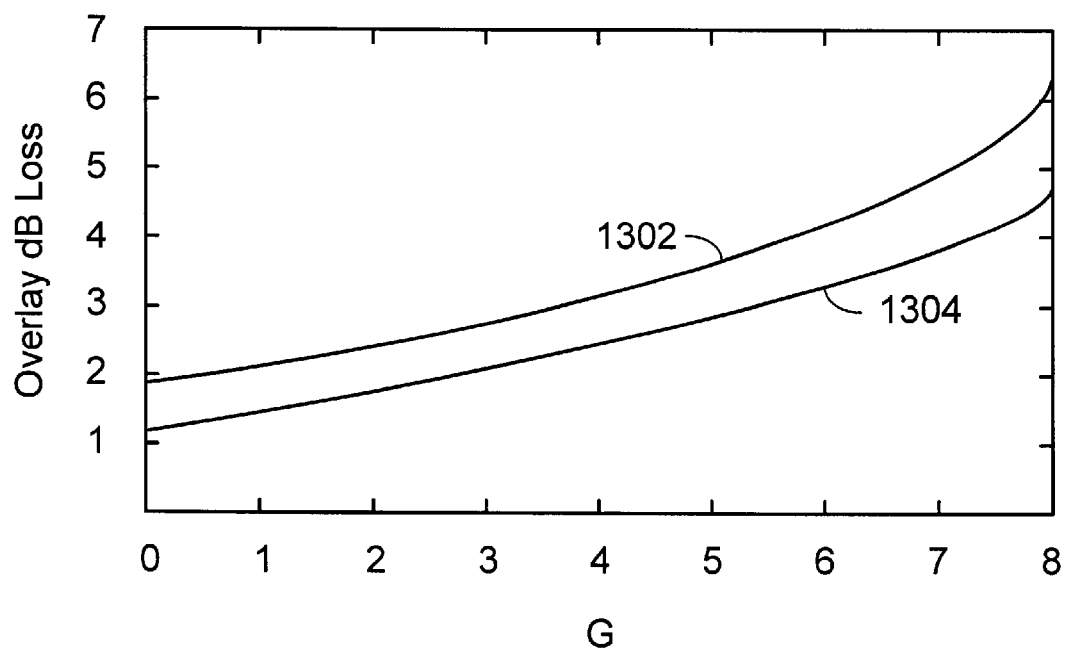

FIG. 13 illustrates performance of an overlay channel which is offset with respect to the center frequency of an overlay channel. Curve 1302 represents performance of the channel in a non-orthogonal overlay system while curve 1304 represents performance of the channel in a partially orthogonal overlay system.

For underlay channels which are offset in frequency with respect to the overlay channel, as indicated by Equation 9, there is an additional frequency term that affects performance. This frequency offset is a function of the specific system requirements. In one example, this offset is approximately 240 kHz (actually 1.2288 MHz+240 kHz). The net effect is that at the underlay receiver, the overlay chips that were designed to be orthogonal, are now modulated by this frequency term. Note that the Walsh function set is closed under multiplication when multiplying two different Walsh codes.

With this property known, the interference from one overly Walsh channel to another can be measured by looking at the resulting Walsh function, after correlating with the desired Walsh function, and looking at the residue after the receiver despread operation. This is expressed by the following normalized Equation 22:

$$\text{Intererenc} = \text{sum}\{W_i \cdot \cos(2\pi m T_c'' \Delta f)\},$$
$$m = \{0\ 1\ 2\ \ldots\ 127\}, \quad \text{Equation 22}$$

which indicates a modulation of Walsh code i with the cosine function and a summation as is performed by the sum and dump portion of the despreading operation. The total interference is comprised of the sum of the interference due to all other Walsh channels. After evaluation of this expression, the results show that for most Walsh channels this contribution will be small.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A base station for use in a CDMA wireless communication system that supports underlay transmissions and direct spread overlay transmissions to a plurality of mobile stations, the base station comprising:
    an interface that receives communications intended for the plurality of mobile stations;
    an underlay unit that receives an underlay portion of the communications and produces underlay transmissions, wherein the underlay unit couples the underlay transmissions on a plurality of underlay carriers, and wherein each of the plurality of underlay carriers occupies a respective underlay bandwidth;
    an overlay unit that receives an overlay portion of the communications and produces overlay transmissions, wherein the overlay unit couples the overlay transmissions on an overlay carrier having an overlay bandwidth that extends across a combined spectrum of the plurality of underlay bandwidths;
    at least one radio frequency unit that transmits the underlay transmissions and the overlay transmissions via at least one antenna to the plurality of mobile stations; and
    the underlay unit and the overlay unit producing the overlay transmissions such that they are at least partially orthogonal to the underlay transmissions.

2. The base station of claim 1, further comprising a synchronization unit coupled to the underlay unit and the overlay unit that causes the overlay transmissions to be substantially synchronized with the underlay transmissions.

3. The base station of claim 1, wherein the overlay transmissions are partially orthogonal to the underlay transmissions.

4. The base station of claim 1, wherein the overlay transmissions are substantially orthogonal to the underlay transmissions.

5. The base station of claim 1, wherein a pseudo noise sequence of the overlay transmissions is punctured by a pseudo noise sequence of the underlay transmissions to produce a portion of the orthogonality.

6. The base station of claim 1, wherein Walsh codes of the overlay transmissions are orthogonal to Walsh codes of the underlay transmissions.

7. The base station of claim 1, wherein the overlay unit spreads the overlay transmissions with an underlay pseudo noise sequence to produce a portion of the orthogonality.

8. The base station of claim 1, wherein the overlay transmissions possess a chip rate that is an integer multiple of a chip rate of the underlay transmissions.

9. A CDMA wireless communication system that supports underlay transmissions and direct spread overlay transmissions to a plurality of mobile stations, the CDMA wireless communication system comprising:
   a base station controller;
   a plurality of base stations coupled to the base station controller;
   an underlay base station of the plurality of base stations comprising:
      a base station controller interface that receives underlay communications intended for the plurality of mobile stations;
      an underlay unit coupled to the base station controller interface that receives the underlay communications and produces underlay transmissions, wherein the underlay unit couples the underlay transmissions on a plurality of underlay carriers, and wherein each of the plurality of underlay carriers occupies a respective underlay bandwidth; and
      a radio frequency unit that receives the underlay transmissions and transmits the underlay transmissions via an antenna to the plurality of mobile stations;
   an overlay base station of the plurality of base stations comprising:
      a base station controller interface that receives overlay communications intended for the plurality of mobile stations;
      an overlay unit coupled to the base station controller interface that receives the overlay communications and produces overlay transmissions, wherein the overlay unit couples the overlay transmissions on an overlay carrier having an overlay bandwidth that extends across a combined spectrum of the plurality of underlay bandwidths; and
      a radio frequency unit that receives the overlay transmissions and transmits the overlay transmissions via an antenna to the plurality of mobile stations; and
   the overlay base station producing the overlay transmissions such that they are at least partially orthogonal to the underlay transmissions produced by the underlay base station.

10. The CDMA wireless communication system of claim 9, further comprising a synchronization unit coupled to the underlay base station and the overlay base station that causes the overlay transmissions to be substantially synchronized with the underlay transmissions.

11. The CDMA wireless communication system of claim 9, wherein the overlay transmissions are partially orthogonal to the underlay transmissions.

12. The CDMA wireless communication system of claim 9, wherein the overlay transmissions are substantially orthogonal to the underlay transmissions.

13. The CDMA wireless communication system of claim 9, wherein a pseudo noise sequence of the overlay transmissions is punctured by a pseudo noise sequence of the underlay transmissions to produce a portion of the orthogonality.

14. The CDMA wireless communication system of claim 9, wherein Walsh codes of the overlay transmissions are orthogonal to Walsh codes of the underlay transmissions.

15. The CDMA wireless communication system of claim 9, wherein the overlay unit spreads the overlay transmissions with an underlay pseudo noise sequence to produce a portion of the orthogonality.

16. The CDMA wireless communication system of claim 9, wherein the overlay transmissions possess a chip rate that is an integer multiple of a chip rate of the underlay transmissions.

17. The CDMA wireless communication system of claim 9, further comprising a mobile switching center coupled to the base station controller.

18. The CDMA wireless communication system of claim 9, wherein:
   some of the plurality of mobile stations support underlay transmissions; and
   other of the plurality of mobile stations support overlay transmissions.

19. In a CDMA wireless communication system that services a plurality of mobile stations, a method of communicating with the plurality of mobile stations comprising:
   receiving communications intended for the plurality of mobile stations;
   dividing the communications into overlay communications and underlay communications;
   converting the underlay communications into underlay transmissions, wherein the underlay transmissions are coupled on a plurality of underlay carriers, and wherein each of the plurality of underlay carriers occupies a respective underlay bandwidth;
   converting the overlay communications into overlay transmissions that are at least partially orthogonal to the underlay communications, wherein the overlay transmissions are coupled on an overlay carrier having an overlay bandwidth that extends across a combined spectrum of the plurality of underlay bandwidths; and
   transmitting the underlay transmissions and the overlay transmissions to the plurality of mobile stations.

20. The method of claim 19, wherein transmission of the overlay transmissions is substantially synchronized with respect to the transmission of the underlay transmissions.

21. The method of claim 19, wherein the overlay transmissions are partially orthogonal to the underlay transmissions.

22. The method of claim 19, wherein the overlay transmissions are substantially orthogonal to the underlay transmissions.

23. The method of claim 19, wherein a pseudo noise sequence of the overlay transmissions is punctured by a pseudo noise sequence of the underlay transmissions to produce a portion of the orthogonality.

24. The method of claim 19, wherein Walsh codes of the overlay transmissions are orthogonal to Walsh codes of the underlay transmissions.

25. The method of claim 19, wherein overlay transmissions are spread with an underlay pseudo noise sequence to produce a portion of the orthogonality.

26. The method of claim 19, wherein the overlay transmissions possess a chip rate that is an integer multiple of a chip rate of the underlay transmissions.

27. A mobile station for use in a CDMA wireless communication system that supports underlay transmissions and direct spread overlay transmissions that are at least partially orthogonal to the underlay transmissions:

an antenna that receives the underlay transmissions and overlay transmissions;

a radio frequency unit coupled to the antenna that receives the underlay transmissions and the overlay transmissions, wherein the underlay transmissions are coupled on a plurality of underlay carriers, wherein each of the plurality of underlay carriers occupies a respective underlay bandwidth, and wherein the overlay transmissions are coupled on an overlay carrier having an overlay bandwidth that extends across a combined spectrum of the plurality of underlay bandwidths;

a rake receiver that receives the underlay transmissions and overlay transmissions and that despreads the underlay transmissions and the overlay transmissions to extract overlay communications.

28. The mobile station of claim 27, wherein the rake receiver comprises:

a pseudo noise correlator that correlates the underlay transmissions and overlay transmissions with an overlay pseudo noise sequence to extract the underlay transmissions; and a Walsh code correlator that correlates the underlay transmissions using an overlay Walsh code that is orthogonal to at least one underlay Walsh code to extract communications intended for the mobile station.

29. The mobile station of claim 28, wherein rake receiver includes a plurality of rake fingers, each including a pseudo noise correlator and a Walsh code correlator.

30. The mobile station of claim 28, wherein the overlay pseudo noise sequence is partially orthogonal to a corresponding underlay pseudo noise sequence.

31. The mobile station of claim 27, wherein the overlay transmissions are substantially orthogonal to the underlay transmissions.

32. The mobile station of claim 27, wherein the overlay transmissions possess a chip rate that is an integer multiple of a chip rate of the underlay transmissions.

33. The base station of claim 1, wherein the underlay bandwidths reside adjacent one another.

34. The CDMA wireless communication system of claim 9, wherein the underlay bandwidths reside adjacent one another.

35. The method of claim 19, wherein the underlay bandwidths reside adjacent one another.

36. The mobile station of claim 27, wherein the underlay bandwidths reside adjacent one another.

* * * * *